US012597161B2

(12) United States Patent
Pillmann et al.

(10) Patent No.: US 12,597,161 B2
(45) Date of Patent: Apr. 7, 2026

(54) SYSTEMS AND METHODS FOR OBJECT TRACKING AND LOCATION PREDICTION

(71) Applicant: Carbon Autonomous Robotic Systems Inc., Seattle, WA (US)

(72) Inventors: Raven Pillmann, Seattle, WA (US); Simon Cochrane, Seattle, WA (US); Brian Phillip Stark, Bothell, WA (US); Alexander Igorevich Sergeev, Newcastle, WA (US)

(73) Assignee: Carbon Autonomous Robotic Systems Inc., Seattle, WA (US)

( * ) Notice: Subject to any disclaimer, the term of this patent is extended or adjusted under 35 U.S.C. 154(b) by 522 days.

(21) Appl. No.: 18/098,540

(22) Filed: Jan. 18, 2023

(65) Prior Publication Data

US 2023/0237697 A1 Jul. 27, 2023

Related U.S. Application Data

(60) Provisional application No. 63/300,999, filed on Jan. 19, 2022.

(51) Int. Cl.
G06T 7/73 (2017.01)
A01G 2/00 (2018.01)

(52) U.S. Cl.
CPC .................. G06T 7/74 (2017.01); A01G 2/00 (2018.02); *G06T 2207/10032* (2013.01); *G06T 2207/30188* (2013.01)

(58) Field of Classification Search
CPC ........... G06T 7/74; G06T 7/246; G06T 7/269; G06T 2207/10032; G06T 2207/30188;
(Continued)

(56) References Cited

U.S. PATENT DOCUMENTS 2,848,119 A    8/1958    Fitser
3,302,052 A    1/1967    Schwab
(Continued)

FOREIGN PATENT DOCUMENTS

AU    2022238342 A1    8/2023
CA    2705830 A1    5/2009
(Continued)

OTHER PUBLICATIONS

Z. H. Khan, I. Y. -H. Gu and A. G. Backhouse, "Robust Visual Object Tracking Using Multi-Mode Anisotropic Mean Shift and Particle Filters," in IEEE Transactions on Circuits and Systems for Video Technology, vol. 21, No. 1, pp. 74-87, Jan. 2011, doi: 10.1109/TCSVT.2011.2106253. (Year: 2011).*
(Continued)

*Primary Examiner* — Chan S Park
*Assistant Examiner* — Paulo Andres Garcia
(74) *Attorney, Agent, or Firm* — Fortem IP LLP

(57) ABSTRACT

Disclosed herein are methods, devices, modules, and systems which may be employed to accurately track, and subsequently target, objects of interest relative to a moving body, such as a vehicle. An object tracking method may be implemented by a detection system with a sensor coupled to the moving body. A targeting system may be used to target objects tracked by the detection system, such as for automated crop cultivation or maintenance. Devices disclosed herein may be configured to locate, identify, and autonomously target a weed with a beam, such as a laser beam, which may burn or irradiate the weed. The methods, devices, modules, and systems may be used for agricultural crop management or for at-home weed control.

32 Claims, 12 Drawing Sheets

(58) Field of Classification Search
CPC . G06T 2207/10016; G06T 2207/10028; G06T 2207/30241; G06T 2207/30252; A01G 2/00; G06V 10/82; G06V 20/56; G06V 20/188

See application file for complete search history.

(56) References Cited

U.S. PATENT DOCUMENTS

| | | | |
|---|---|---|---|
| 3,618,609 A | 11/1971 | Glick et al. | |
| 3,675,621 A | 7/1972 | Griffin et al. | |
| 3,741,214 A | 6/1973 | Tillander | |
| 3,778,155 A | 12/1973 | Leavitt | |
| 6,199,000 B1 | 3/2001 | Keller et al. | |
| 6,477,403 B1 | 11/2002 | Eguchi et al. | |
| 6,553,299 B1 | 4/2003 | Keller et al. | |
| 6,795,568 B1 | 9/2004 | Christensen et al. | |
| 7,526,100 B1 | 4/2009 | Hartman et al. | |
| 7,859,519 B2 | 12/2010 | Tulbert | |
| 7,919,723 B2 | 4/2011 | Ide et al. | |
| 7,993,585 B2 | 8/2011 | Black et al. | |
| 8,216,214 B2 | 7/2012 | Weir | |
| 8,665,436 B2 | 3/2014 | Pagnoux et al. | |
| 8,746,914 B2 | 6/2014 | Nelson et al. | |
| 9,000,340 B2 | 4/2015 | Dicander | |
| 9,207,309 B2 | 12/2015 | Bridges | |
| 9,289,122 B2 | 3/2016 | Chinnock et al. | |
| 9,456,067 B2 | 9/2016 | Rudow et al. | |
| 9,462,446 B2 | 10/2016 | Rudow et al. | |
| 9,467,814 B2 | 10/2016 | Rudow et al. | |
| 9,476,695 B2 | 10/2016 | Becker et al. | |
| 9,565,848 B2 | 2/2017 | Stowe et al. | |
| 9,609,859 B2 | 4/2017 | Stowe et al. | |
| 9,639,941 B2 | 5/2017 | Rudow et al. | |
| 9,654,222 B1 | 5/2017 | Shatz et al. | |
| 9,709,987 B2 | 7/2017 | Hyde et al. | |
| 9,955,551 B2 | 4/2018 | Spero | |
| 9,992,396 B1 | 6/2018 | Scepanovic et al. | |
| 10,006,872 B2 | 6/2018 | Seo et al. | |
| 10,010,067 B2 | 7/2018 | Kent et al. | |
| 10,051,854 B2 | 8/2018 | Stowe et al. | |
| 10,126,415 B2 | 11/2018 | Becker et al. | |
| 10,183,542 B1 | 1/2019 | Bittner et al. | |
| 10,226,036 B2 | 3/2019 | Guice et al. | |
| 10,241,207 B2 | 3/2019 | Rosenzweig et al. | |
| 10,371,935 B1 | 8/2019 | Patel | |
| 10,489,621 B2 | 11/2019 | Moriyama | |
| 10,502,555 B2 | 12/2019 | Nakamura et al. | |
| 10,624,275 B1 | 4/2020 | Lewis | |
| 10,684,370 B2 | 6/2020 | Demersseman et al. | |
| 10,750,736 B2 | 8/2020 | Kent et al. | |
| 10,776,639 B2 | 9/2020 | Steinberg et al. | |
| 10,905,397 B2 | 2/2021 | Yang et al. | |
| 11,048,940 B2 | 6/2021 | Kiepe et al. | |
| 11,076,589 B1 | 8/2021 | Sibley et al. | |
| 11,093,745 B2 | 8/2021 | Redden et al. | |
| 11,129,343 B2 | 9/2021 | Redden et al. | |
| 11,153,499 B2 | 10/2021 | Behrooz et al. | |
| 11,255,663 B2 | 2/2022 | Binder | |
| 11,344,022 B2 | 5/2022 | Jackson et al. | |
| 11,373,288 B2 | 6/2022 | Peters | |
| 11,375,707 B1 | 7/2022 | Guice et al. | |
| 11,399,531 B1 | 8/2022 | Sibley et al. | |
| 11,423,662 B2 * | 8/2022 | Neumann | H04N 7/185 |
| 11,425,852 B2 | 8/2022 | Sibley et al. | |
| 11,432,470 B2 | 9/2022 | Kurihara et al. | |
| 11,517,008 B1 | 12/2022 | Sibley et al. | |
| 11,526,997 B2 | 12/2022 | Sibley et al. | |
| 11,553,634 B2 | 1/2023 | Grant et al. | |
| 11,553,636 B1 | 1/2023 | Palomares et al. | |
| 11,589,570 B2 | 2/2023 | Schlemmer | |
| 11,602,143 B2 | 3/2023 | Mikesell et al. | |
| 11,694,434 B2 | 7/2023 | Sibley et al. | |
| 11,748,976 B2 | 9/2023 | Redden et al. | |
| 11,751,559 B2 | 9/2023 | Sibley et al. | |
| 11,785,873 B2 | 10/2023 | Sibley et al. | |
| 11,937,524 B2 | 3/2024 | Sibley et al. | |
| 12,056,845 B2 | 8/2024 | Peake et al. | |
| 12,108,752 B2 | 10/2024 | Mikesell et al. | |
| 12,127,547 B2 | 10/2024 | Mikesell et al. | |
| 12,141,985 B2 * | 11/2024 | Cui | A01B 39/18 |
| 12,219,948 B1 | 2/2025 | Mikesell et al. | |
| 12,270,903 B2 | 4/2025 | Sergeev | |
| 2013/0194548 A1 | 8/2013 | Francis et al. | |
| 2014/0311014 A1 | 10/2014 | Feugier | |
| 2015/0070712 A1 | 3/2015 | Cramer et al. | |
| 2015/0071490 A1 | 3/2015 | Fukata et al. | |
| 2015/0075067 A1 | 3/2015 | Stowe et al. | |
| 2015/0075068 A1 | 3/2015 | Stowe et al. | |
| 2015/0245554 A1 | 9/2015 | Redden | |
| 2016/0117560 A1 | 4/2016 | Levi et al. | |
| 2016/0181764 A1 | 6/2016 | Kanskar et al. | |
| 2016/0205917 A1 | 7/2016 | Chan et al. | |
| 2016/0205918 A1 | 7/2016 | Chan et al. | |
| 2016/0286779 A1 | 10/2016 | Guice | |
| 2017/0146654 A1 | 5/2017 | Halloran et al. | |
| 2017/0188564 A1 | 7/2017 | Stowe et al. | |
| 2017/0359943 A1 | 12/2017 | Calleija et al. | |
| 2018/0136319 A1 | 5/2018 | Send et al. | |
| 2018/0285482 A1 | 10/2018 | Santos et al. | |
| 2019/0097722 A1 | 3/2019 | Mclaurin et al. | |
| 2019/0154439 A1 | 5/2019 | Binder | |
| 2019/0159442 A1 | 5/2019 | Benjegerdes | |
| 2019/0200519 A1 | 7/2019 | Chrysanthakopoulos et al. | |
| 2019/0239502 A1 * | 8/2019 | Palomares | G05D 1/0246 |
| 2019/0274296 A1 | 9/2019 | Schmidt | |
| 2019/0285893 A1 | 9/2019 | Wang et al. | |
| 2019/0353784 A1 | 11/2019 | Toledano et al. | |
| 2020/0012852 A1 | 1/2020 | Ding et al. | |
| 2020/0116643 A1 | 4/2020 | Kun et al. | |
| 2020/0120886 A1 | 4/2020 | Geltner | |
| 2020/0150446 A1 | 5/2020 | Thibon et al. | |
| 2020/0205394 A1 | 7/2020 | Day et al. | |
| 2020/0250838 A1 * | 8/2020 | Simon | G06T 7/20 |
| 2021/0076662 A1 | 3/2021 | Mikesell et al. | |
| 2021/0230904 A1 | 7/2021 | Pizzato et al. | |
| 2021/0319231 A1 * | 10/2021 | Yuan | G06N 3/04 |
| 2022/0254155 A1 | 8/2022 | Janssen et al. | |
| 2022/0299635 A1 | 9/2022 | Sergeev | |
| 2022/0361475 A1 | 11/2022 | Bachman et al. | |
| 2023/0044040 A1 | 2/2023 | Xu et al. | |
| 2023/0121291 A1 | 4/2023 | Sibley et al. | |
| 2023/0122084 A1 | 4/2023 | Sibley et al. | |
| 2023/0137419 A1 | 5/2023 | Sergeev et al. | |
| 2023/0232811 A1 | 7/2023 | Einat | |
| 2023/0247928 A1 | 8/2023 | Sibley et al. | |
| 2023/0252624 A1 | 8/2023 | Sergeev et al. | |
| 2023/0252789 A1 | 8/2023 | Sibley et al. | |
| 2023/0252791 A1 | 8/2023 | Webb et al. | |
| 2023/0270036 A1 | 8/2023 | Groffils et al. | |
| 2023/0292736 A1 | 9/2023 | Mikesell et al. | |
| 2023/0292737 A1 | 9/2023 | Thompson et al. | |
| 2023/0309444 A1 | 10/2023 | Cordeiro et al. | |
| 2023/0333011 A1 | 10/2023 | Dev et al. | |
| 2023/0343090 A1 | 10/2023 | Khait et al. | |
| 2023/0360392 A1 | 11/2023 | Sibley et al. | |
| 2023/0363370 A1 | 11/2023 | Delatree et al. | |
| 2023/0371493 A1 | 11/2023 | Werner et al. | |
| 2023/0384794 A1 | 11/2023 | Brossard et al. | |
| 2023/0397597 A1 | 12/2023 | Charipar et al. | |
| 2023/0404056 A1 | 12/2023 | Sibley et al. | |
| 2023/0413800 A1 | 12/2023 | Jasko et al. | |
| 2024/0020951 A1 | 1/2024 | Redden et al. | |
| 2024/0041018 A1 | 2/2024 | Mikesell et al. | |
| 2024/0049697 A1 | 2/2024 | Schmeer et al. | |
| 2024/0057502 A1 | 2/2024 | Sibley et al. | |
| 2024/0074427 A1 | 3/2024 | Tanner | |
| 2024/0155221 A1 | 5/2024 | Watanabe | |
| 2024/0206451 A1 | 6/2024 | Anderson | |
| 2024/0224977 A9 | 7/2024 | Leger et al. | |
| 2024/0251694 A1 | 8/2024 | Sibley et al. | |
| 2024/0268246 A1 | 8/2024 | Stark et al. | |
| 2024/0268277 A1 | 8/2024 | Cochrane et al. | |

(56) References Cited

U.S. PATENT DOCUMENTS

| | | | |
|---|---|---|---|
| 2025/0031684 A1 | 1/2025 | Mikesell et al. |
| 2025/0081959 A1 | 3/2025 | Mikesell et al. |
| 2025/0176525 A1 | 6/2025 | Mikesell et al. |

FOREIGN PATENT DOCUMENTS

| | | | |
|---|---|---|---|
| CN | 105045950 | A | 11/2015 |
| CN | 114641666 | A | 6/2022 |
| EP | 1098563 | B1 | 2/2003 |
| EP | 2848119 | B1 | 12/2016 |
| EP | 3159651 | A1 | 4/2017 |
| EP | 3302052 | B1 | 10/2019 |
| EP | 3700337 | A1 | 9/2020 |
| EP | 3700338 | A1 | 9/2020 |
| EP | 3937628 | A1 | 1/2022 |
| EP | 4031832 | A1 | 7/2022 |
| EP | 4147942 | A1 | 3/2023 |
| EP | 4175470 | A2 | 5/2023 |
| EP | 3618609 | B1 | 8/2023 |
| EP | 4228403 | A1 | 8/2023 |
| EP | 4228404 | A1 | 8/2023 |
| EP | 4243592 | A1 | 9/2023 |
| EP | 4243613 | A1 | 9/2023 |
| EP | 4031832 | A4 | 10/2023 |
| EP | 4301135 | A1 | 1/2024 |
| EP | 4309129 | A1 | 1/2024 |
| EP | 4185106 | B1 | 5/2024 |
| EP | 4358712 | A1 | 5/2024 |
| EP | 4358713 | A1 | 5/2024 |
| EP | 4358714 | A1 | 5/2024 |
| EP | 3675621 | B1 | 8/2024 |
| EP | 3741214 | B1 | 8/2024 |
| EP | 4418845 | A1 | 8/2024 |
| JP | 2001275541 | A | 10/2001 |
| JP | 2015062412 | A | 4/2015 |
| JP | 2022548645 | A | 11/2022 |
| KR | 20150124305 | A | 11/2015 |
| WO | 2002017705 | A1 | 7/2004 |
| WO | 2009126264 | A2 | 10/2009 |
| WO | 2013111134 | A1 | 8/2013 |
| WO | 2019064062 | A1 | 4/2019 |
| WO | 2019079556 | A1 | 4/2019 |
| WO | 2019144231 | A1 | 8/2019 |
| WO | 2019222109 | A1 | 11/2019 |
| WO | 2020008465 | A1 | 1/2020 |
| WO | 2021055485 | A1 | 3/2021 |
| WO | 2022006643 | A1 | 1/2022 |
| WO | 2022043568 | A2 | 3/2022 |
| WO | 2022197831 | A1 | 9/2022 |
| WO | 2023021769 | A1 | 2/2023 |
| WO | 2023058333 | A1 | 4/2023 |
| WO | 2023141144 | A1 | 7/2023 |
| WO | 2023150023 | A1 | 8/2023 |
| WO | 2023180566 | A1 | 9/2023 |
| WO | 2024165111 | A1 | 8/2024 |
| WO | 2024168302 | A1 | 8/2024 |

OTHER PUBLICATIONS

R. Hess and A. Fern, "Discriminatively trained particle filters for complex multi-object tracking," 2009 IEEE Conference on Computer Vision and Pattern Recognition, Miami, FL, USA, 2009, pp. 240-247, doi: 10.1109/CVPR.2009.5206801. (Year: 2009).*

C. Kim, F. Li, A. Ciptadi and J. M. Rehg, "Multiple Hypothesis Tracking Revisited," 2015 IEEE International Conference on Computer Vision (ICCV), Santiago, Chile, 2015, pp. 4696-4704, doi: 10.1109/ICCV.2015.533. (Year: 2015).*

N. P. Papanikolopoulos, P. K. Khosla and T. Kanade, "Visual tracking of a moving target by a camera mounted on a robot: a combination of control and vision," in IEEE Transactions on Robotics and Automation, vol. 9, No. 1, pp. 14-35, Feb. 1993, doi: 10.1109/70.210792. (Year: 1993).*

Nadimi, et al., "Designing, modeling and controlling a novel autonomous laser weeding system", ASABE Technical Library—Jan. 2009; pp. 8.

International Search Report and Written Opinion for Application No. PCT/US2023/011030, mailed on Mar. 18, 2023, 19 Pages.

Wu X., et al., "Design and Implementation of Computer Vision based In-Row Weeding System," 2018, (hal-01876696), Retrieved from the Internet: URL: https://hal.science/hal-01876696, 8 pages.

Yuan J., et al., "ROW-SLAM: Under-Canopy Cornfield Semantic SLAM," arXiv:2109.07134v1, Sep. 15, 2021, 7 pages.

"NAIO Technologies, Market Gardens, Plant Nurseries, Horticulture, Aromatic and Medicinal Plant Farming", OZ Brochure, Jul. 30, 2019, 8 Pages.

Amjoud, et al., "Convolutional Neural Networks Backbones for Object Detection", Springer, ICISP 2020, LNCS 12119, 2020, pp. 282-289.

Farmwise-Flyer, "Vulcan", World Ag Expo, Feb. 14, 2023, Retrieved from the internet URL: https://farmwise.io/assets/downloads/Farmwise-Flyer-2023.pdf, 2 pages.

Gosselink, et al., "Lignin as a Renewable Aromatic Resource for the Chemical Industry", PhD Thesis, Wageningen University, Wageningen, NL, 2011, 198 pages.

* cited by examiner

510 IMAGE (t)

520 LOCATE WEEDS AT TIME (t)

530 IMAGE (t+dt)

540 LOCATE WEEDS AT TIME (t+dt)

550 DEDUPLICATE WEEDS

560 PREDICT WEED LOCATIONS AT TIME $(t+dt+dt_2)$

610 — PROVIDE WEED LOCATIONS AT TIME (t)

620 — APPLY SHIFT TO WEED LOCATIONS AT TIME (t)

630 — DETERMINE SHIFTED WEED LOCATIONS AT TIME (t+dt) BASED ON SHIFT

640 — PROVIDE WEED LOCATIONS AT TIME (t+dt)

650 — COMPARE SHIFTED WEED LOCATIONS AT TIME (t+dt) TO WEED LOCATIONS AT (t+dt)

660 — PAIR CORRESPONDING WEED LOCATIONS AT TIME (t) AND TIME (t+dt)

670 — DETERMINE WEED TRAJECTORIES FROM TIME (t) TO TIME (t+dt)

SYSTEMS AND METHODS FOR OBJECT TRACKING AND LOCATION PREDICTION

CROSS-REFERENCE

This application claims the benefit of U.S. Provisional Application No. 63/300,999, filed Jan. 19, 2022, which application is incorporated herein by reference.

BACKGROUND

As technology advances, tasks that had previously been performed by humans are increasingly becoming automated. While tasks performed in highly controlled environments, such as factory assembly lines, can be automated by directing a machine to perform the task the same way each time, tasks performed in unpredictable environments, such as driving on city streets or vacuuming a cluttered room, depend on dynamic feedback and adaptation to perform the task. Autonomous systems often struggle to identify and locate objects in unpredictable environments. Improved methods of object tracking would advance automation technology and increase the ability of autonomous systems to react and adapt to unpredictable environments.

SUMMARY

In various aspects, the present disclosure provides a method of predicting a location of a tracked object relative to a moving vehicle, the method comprising: in a first image at a first time, determining a first set of actual locations for a first set of objects relative to a moving vehicle; in a second image at a second time, determining a second set of actual locations for a second set of objects relative to the moving vehicle, wherein the second set of objects includes one or more of the same objects as the first set of objects; applying a plurality of test shifts to the first set of actual locations for the first set of objects to obtain a set of test locations for the first set of objects at the second time, wherein each test shift of the plurality of test shifts is determined based on a distance between a first actual location of a first object at the first time and a second actual location of a second object at the second time; determining a plurality of offsets between each of the test locations of the set of test locations for the first set of objects at the second time and each of the second set of actual locations for the second set of objects at the second time, wherein each offset of the plurality of offsets corresponds to a test shift of the plurality of test shifts; selecting a refined shift from the plurality of test shifts based on the plurality of offsets; and identifying a tracked object included in both the first set of objects and the second set of objects.

In some aspects, the method further comprises applying the refined shift to the first set of actual locations for a first set of objects at the first time to establish a set of shifted locations for the first set of objects at the second time. In some aspects, the method further comprises determining a vector displacement of the tracked object between the first time and the second time from an actual location of the tracked object in the first image at the first time and an actual location of the tracked object in the second image at the second time. In some aspects, the refined shift is a test shift from the plurality of test shifts with the smallest corresponding offset. In some aspects, the method further comprises determining a vector velocity of the moving vehicle.

In various aspects, the present disclosure provides a method of predicting a location of a tracked object relative to a moving vehicle, the method comprising: in a first image at a first time, determining a first set of actual locations for a first set of objects relative to a moving vehicle; in a second image at a second time, determining a second set of actual locations for a second set of objects relative to the moving vehicle, wherein the second set of objects includes one or more of the same objects as the first set of objects; applying a predicted shift to the first set of actual locations for the first set of objects to produce a set of intermediate locations, wherein the predicted shift is based on a vector velocity of the moving vehicle and a time difference between the first time and the second time; applying a second shift to the set of intermediate locations to obtain a set of shifted locations for the first set of objects at the second time, wherein the second shift is determined based on a distance between a first intermediate location of a first object of the set of intermediate locations and a second actual location of a second object at the second time; identifying a tracked object included in the first set of objects; designating a search area; selecting an actual location of the tracked object from the second set of objects in the second image at the second time from the second set of actual locations, wherein the actual location of the tracked object in the second image at the second time is within the search area; and determining a vector displacement of the tracked object between the first time and the second time from an actual location of the tracked object in the first image at the first time and an actual location of the tracked object in the second image at the second time.

In some aspects, an intermediate location of the tracked object from the set of intermediate locations is within the search area. In some aspects, the method comprises designating the search area around the intermediate location of the tracked object. In some aspects, the method comprises designating the search area around the actual location of the tracked object.

In various aspects, the present disclosure provides a method of predicting a location of a tracked object relative to a moving vehicle, the method comprising: in a first image at a first time, determining a first set of actual locations for a first set of objects relative to a moving vehicle; in a second image at a second time, determining a second set of actual locations for a second set of objects relative to the moving vehicle, wherein the second set of objects includes one or more of the same objects as the first set of objects; identifying a tracked object included in the first set of objects; applying a predicted shift to an actual location of the tracked object in the first image at the first time to produce a shifted location of the tracked object at the second time, wherein the predicted shift is based on a vector velocity of the moving vehicle and a time difference between the first time and the second time; designating a search area; selecting an actual location of the tracked object from the second set of objects in the second image at the second time from the second set of actual locations, wherein the actual location of the tracked object in the second image at the second time is within the search area; and determining a vector displacement of the tracked object between the first time and the second time from an actual location of the tracked object in the first image at the first time and an actual location of the tracked object in the second image at the second time.

In some aspects, the method comprises designating the search area around the shifted location of the tracked object. In some aspects, the method comprises designating the search area around the actual location of the tracked object. In some aspects, the shifted location of the tracked object is within the search area. In some aspects, the method comprises applying the predicted shift to each location of the first set of actual locations to produce a set of shifted locations. In some aspects, the method further comprises applying a second shift to the shifted location to produce a revised shifted location of the tracked object, wherein the second shift is based on a distance between a shifted location of the set of shifted locations and an actual location of the second set of actual locations. In some aspects, the method comprises designating the search area around the revised shifted location of the tracked object. In some aspects, the revised shifted location of the tracked object is within the search area.

In some aspects, the method further comprises determining a trajectory of the tracked object over time based on the vector displacement of the tracked object between the first time and the second time and the vector velocity of the moving vehicle. In some aspects, the method further comprises determining a predicted location of the tracked object at a third time based on the vector displacement of the tracked object between the first time and the second time and an elapsed time between the second time and the third time.

In various aspects, the present disclosure provides a method of predicting a location of a tracked object relative to a moving vehicle, the method comprising: in a first image at a first time, determining a first set of actual locations for a first set of objects relative to a moving vehicle; identifying a tracked object included in the first set of objects; determining a vector velocity of the moving vehicle; and determining a predicted location of the tracked object at a second time based on the vector velocity, a time difference between the first time and the second time, and an actual location of the tracked object in the first image at the first time.

In some aspects, the vector velocity is determined using optical flow, a rotary encoder, a global positioning system, or a combination thereof. In some aspects, optical flow is performed using consecutive image frames. In some aspects, optical flow is determined using image frames which overlap by at least 10%. In some aspects, optical flow is determined using image frames displaced by no more than about 90%.

In some aspects, the first set of actual locations, the second set of actual locations, the set of shifted locations, the predicted location, or combinations thereof comprise a first dimension and a second dimension. In some aspects, the first dimension is parallel to a direction of motion of the moving vehicle. In some aspects, the first dimension and the second dimension are parallel to an image plane comprising the first image or the second image. In some aspects, the first set of actual locations, the second set of actual locations, the set of shifted locations, the predicted location, or combinations thereof further comprise a third dimension. In some aspects, the third dimension is perpendicular to an image plane comprising the first image or the second image. In some aspects, the third dimension is determined based on the vector velocity of the moving vehicle and the vector displacement of the tracked object. In some aspects, the test shift, the predicted shift, or the refined shift is applied along the first dimension. In some aspects, the test shift, the predicted shift, or the refined shift is applied in the first dimension and the second dimension. In some aspects, the test shift, the predicted shift, or the refined shift is applied in the first dimension, the second dimension, and the third dimension.

In some aspects, the method further comprises determining a parameter of the tracked object. In some aspects, the parameter comprises a size, a shape, a plant category, an orientation, or a plant type. In some aspects, the plant category is a weed or a crop. In some aspects, the method further comprises determining a confidence value of the parameter. In some aspects, the method further comprises determining a second predicted location based on the predicted location and the actual location of the tracked object in the first image at the first time, the actual location of the tracked object in the second image at the second time, or both.

In some aspects, the method further comprises targeting the tracked object at the predicted location. In some aspects, targeting the tracked object comprises correcting for parallax, distortions in the first image, distortions in the second image, targeting distortions, or a combination thereof. In some aspects, targeting the tracked object comprises aiming a targeting sensor, an implement, or both toward the predicted location. In some aspects, targeting the tracked object further comprises dynamically tracking the object with the targeting sensor, the implement, or both. In some aspects, dynamically tracking the object comprises moving the targeting sensor, the implement, or both to match the vector velocity of the moving vehicle such that the targeting sensor, the implement, or both remain aimed toward the predicted location while the moving vehicle moves. In some aspects, the implement comprises a laser, a sprayer, or a grabber. In some aspects, targeting the tracked object further comprises manipulating the tracked object with the implement. In some aspects, manipulating the tracked object comprises irradiating the tracked object with electromagnetic radiation, moving the tracked object, spraying the tracked object, or combinations thereof. In some aspects, the electromagnetic radiation is infrared light.

In some aspects, the tracked object is positioned on a surface. In some aspects, the surface is a ground surface, a dirt surface, or an agricultural surface. In some aspects, the first set of objects, the second set of objects, the tracked object, or combinations thereof comprises a plant. In some aspects, the first set of objects, the second set of objects, the tracked object, or combinations thereof comprises a weed. In some aspects, the first set of objects, the second set of objects, the tracked object, or combinations thereof comprises a crop. In some aspects, the tracked object is a plant. In some aspects, the tracked object is a weed. In some aspects, the tracked object is a crop. In some aspects, the moving vehicle is a trailer or an autonomous vehicle. In some aspects, the method further comprises collecting the first image, the second image, or both with a sensor. In some aspects, the sensor is coupled to the moving vehicle.

In various aspects, the present disclosure provides an object tracking system comprising: a prediction system comprising a sensor configured to collect a first image at a first time and a second image at a second time, wherein the sensor is coupled to a vehicle; and a targeting system comprising an implement; wherein the prediction system is configured to: in the first image at the first time, determine a first set of actual locations for a first set of objects relative to the vehicle; in the second image at the second time, determine a second set of actual locations for a second set of objects relative to the vehicle, wherein the second set of objects includes one or more of the same objects as the first set of objects; apply a plurality of test shifts to the first set of actual locations for the first set of objects to obtain a set of test locations for the first set of objects at the second time, wherein each test shift of the plurality of test shifts is determined based on a distance between a first actual location of a first object at the first time and a second actual location of a second object at the second time; determine a plurality of offsets between each of the test locations of the set of test locations for the first set of objects at the second time and each of the second set of actual locations for the second set of objects at the second time, wherein each offset of the plurality of offsets corresponds to a test shift of the plurality of test shifts; select a refined shift from the plurality of test shifts based on the plurality of offsets; and identify a tracked object included in both the first set of objects and the second set of objects; and wherein the targeting system is configured to target the tracked object with the implement.

In some aspects, the vehicle is configured to move relative to a surface. In some aspects, the first set of objects, the second set of objects, the tracked object, or combinations thereof are positioned on the surface. In some aspects, the first set of objects, the second set of objects, the tracked object, or combinations thereof comprises a plant. In some aspects, the first set of objects, the second set of objects, the tracked object, or combinations thereof comprises a weed. In some aspects, the first set of objects, the second set of objects, the tracked object, or combinations thereof comprises a crop.

In some aspects, the vehicle comprises an autonomous vehicle or a trailer. In some aspects, the sensor is a camera. In some aspects, the sensor fixed relative to the vehicle. In some aspects, the implement is configured to point toward the tracked object and manipulate the tracked object. In some aspects, the targeting system further comprises a targeting sensor. In some aspects, the targeting sensor is configured to point toward the tracked object and image the tracked object. In some aspects, the targeting system is configured to aim the implement at the tracked object based on a location of the tracked object in a targeting image collected by the targeting sensor. In some aspects, the implement is a laser. In some aspects, the object tracking system is configured to perform a method as described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
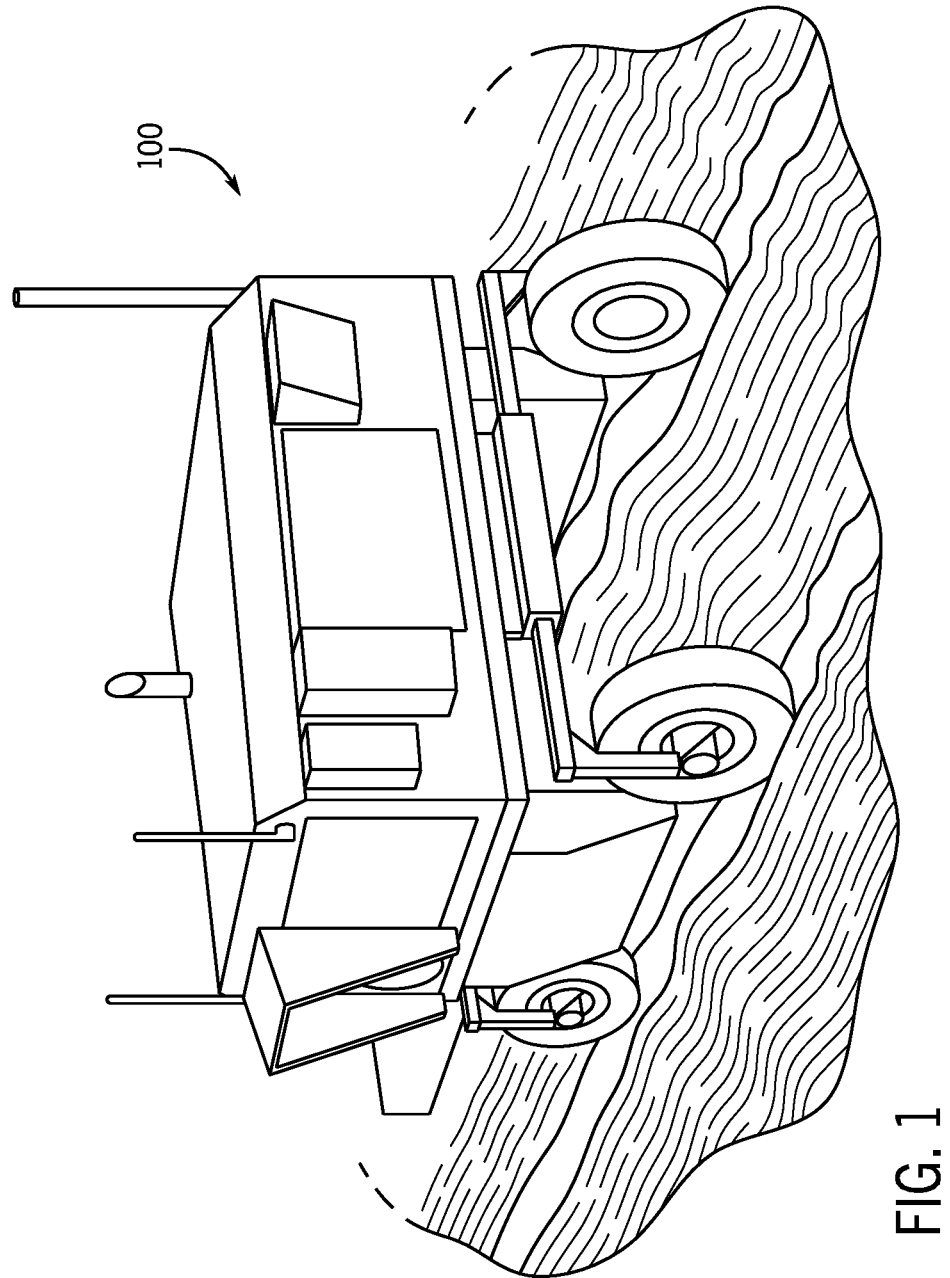
FIG. 1 illustrates an isometric view of an autonomous laser weed eradication vehicle, in accordance with one or more embodiments herein.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods, and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Described herein are systems and methods for tracking objects relative to a moving body, such as a vehicle, and predicting future locations of the objects with high precision. Object tracking, particularly from a moving body (e.g., a moving vehicle), can be challenging due to many factors including speed of the moving body, positional changes of the moving body, change in object shape or position over time, movement of the object relative to a surface, full or partial obfuscation of the object, density of the objects being tracked, proximity to other objects, optical distortions in the detection system, and parallax due to variations in object distances and changing viewing angles. In some embodiments, object tracking may account for movement of the object relative to the moving body, movement of the object relative to a surface, or both. The systems and methods of the present disclosure enable tracking of multiple objects over time from a moving vehicle to target the objects with high precision, in three dimensions, at a predicted future position. The methods of the present disclosure may be used to determine trajectories of individual objects, relative to a moving system, by precisely locating the same object in two or more temporally and spatially separated images. Since objects, such as weeds or other plants, may be similar in appearance, existing software may be ill-equipped to distinguish and track multiple objects with sufficiently high precision, particularly as object density and displacement between image frames increases.

Figure 2:
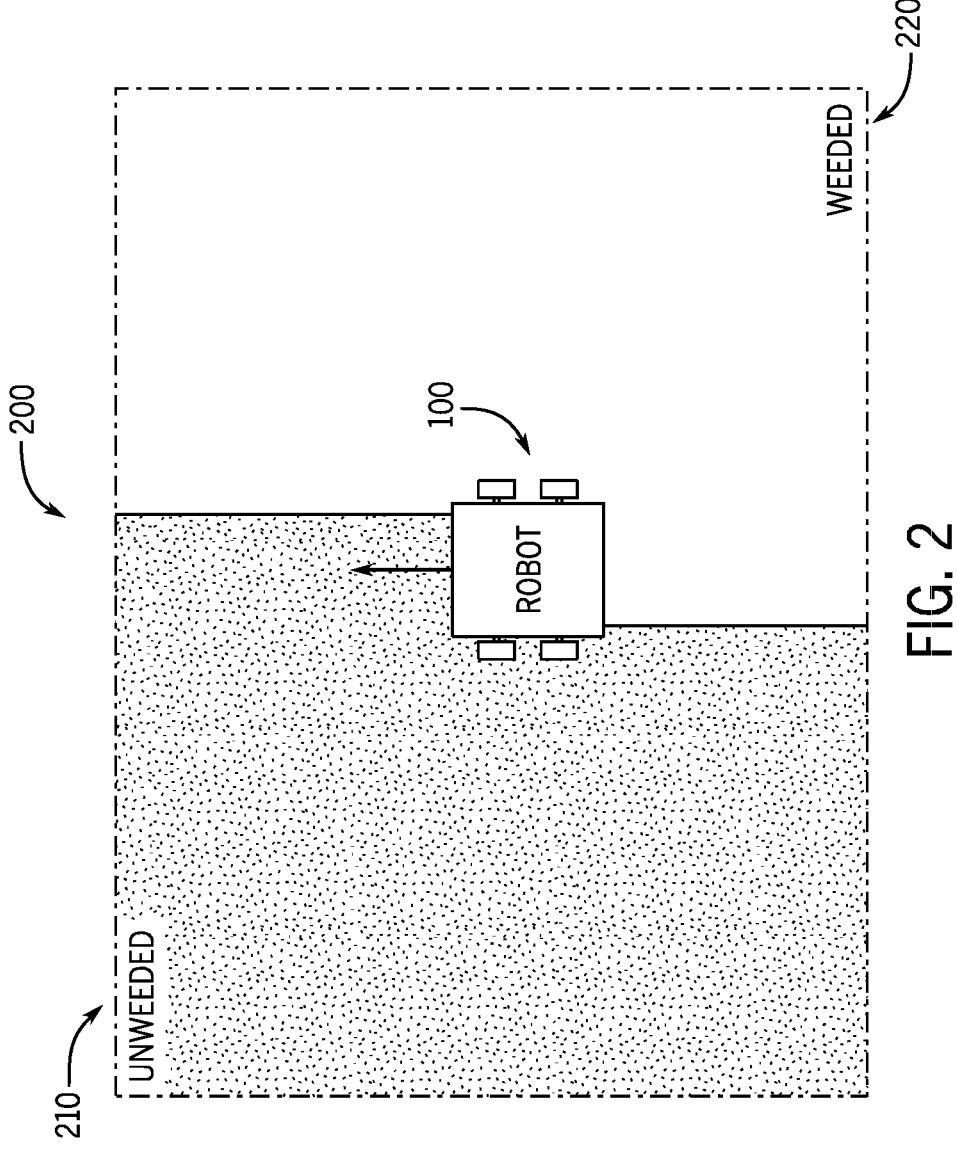
FIG. 2 illustrates a top view of an autonomous laser weed eradication vehicle navigating a field of crops while implementing various techniques described herein.
Figure 3:
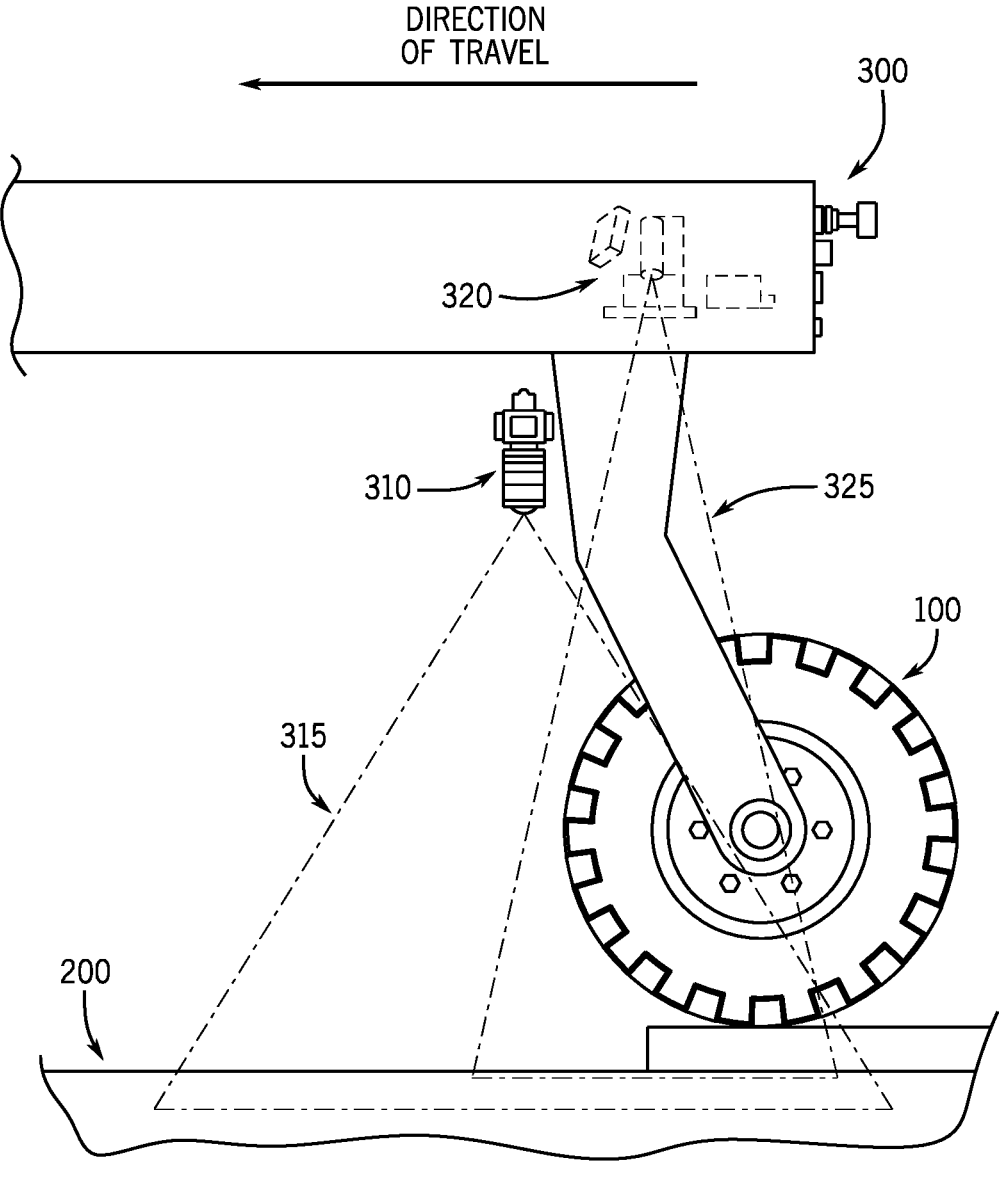
FIG. 3 illustrates a side view of a detection system positioned on an autonomous laser weed eradication vehicle, in accordance with one or more embodiments herein.

A system of the present disclosure, such as the laser weeding systems depicted in FIG. 1, FIG. 2, and FIG. 3, may collect images of a surface as it travels along the surface. Objects identified in the collected images may be tracked to predict locations of the objects relative to the system at a later point in time. As described herein, objects identified in a first image may be paired with the same objects identified in a second image, and relative trajectories for each paired object may be determined. Pairing objects in the first image and the second image may be performed by applying a shift to the objects in the first image and comparing locations of the shifted objects from the first image to locations of objects in the second image. An object from the second image with a location that closely matches the shifted location of an object from the first image may be identified as the same object identified in the first image. Such an object that appears in both the first image and the second image may be deduplicated by assigning the object's location in the first image and its location in the second image to the same object.

A set of tracked objects may be reconciled by connecting objects identified in two or more images, adding newly identified objects to the set, and removing objects that are no longer present. A trajectory for each connected object appearing in two or more images may be determined from its locations in the two or more images, and the trajectory may be used to predict a location of the object at a later point in time. The images may be consecutive images or non-consecutive images. Alternatively or in addition, a trajectory of the object may be determined based on a single location and a vector velocity of the moving body relative to the object or a surface on which the object is positioned. In some embodiments, this predicted location may be targeted, for example using a targeting system comprising a laser, to manipulate or interact with the object at the later point in time. This tracking method enables precision targeting of the object by a moving system, such as a laser weeding system.

As used herein, an "image" may refer to a representation of a region or object. For example, an image may be a visual representation of a region or object formed by electromagnetic radiation (e.g., light, x-rays, microwaves, or radio waves) scattered off of the region or object. In another example, an image may be a point cloud model formed by a light detection and ranging (LIDAR) or a radio detection and ranging (RADAR) sensor. In another example, an image may be a sonogram produced by detecting sonic, infrasonic, or ultrasonic waves reflected off of the region or object. As used herein, "imaging" may be used to describe a process of collecting or producing a representation (e.g., an image) of a region or an object.

As used herein a position, such as a position of an object or a position of a sensor, may be expressed relative to a frame of reference. Exemplary frames of reference include a surface frame of reference, a vehicle frame of reference, a sensor frame of reference, or an actuator frame of reference. Positions may be readily converted between frames of reference, for example by using a conversion factor or a calibration model. While a position, a change in position, or an offset may be expressed in a one frame of reference, it should be understood that the position, change in position, or offset may be expressed in any frame of reference or may be readily converted between frames of reference.

As used herein, a "sensor" may refer to a device capable of detecting or measuring an event, a change in an environment, or a physical property. For example, a sensor may detect light, such as visible, ultraviolet, or infrared light, and generate an image. Examples of sensors include cameras (e.g., a charge-coupled device (CCD) camera or a complementary metal-oxide-semiconductor (CMOS) camera), a LIDAR detector, an infrared sensor, an ultraviolet sensor, or an x-ray detector.

As used herein, "object" may refer to an item or a distinguishable area that may be observed, tracked, manipulated, or targeted. For example, an object may be a plant, such as a crop or a weed. In another example, an object may be a piece of debris. In another example, an object may be a distinguishable region or point on a surface, such as a marking or surface irregularity.

As used herein, "targeting" or "aiming" may refer to pointing or directing a device or action toward a particular location or object. For example, targeting an object may comprise pointing a sensor (e.g., a camera) or implement (e.g., a laser) toward the object. Targeting or aiming may be dynamic, such that the device or action follows an object moving relative to the targeting system. For example, a device positioned on a moving vehicle may dynamically target or aim at an object located on the ground by following the object as the vehicle moves relative to the ground.

As used herein, a "weed" may refer to an unwanted plant, such as a plant of an unwanted type or a plant growing in an undesirable place or at an undesirable time. For example, a weed may be a wild or invasive plant. In another example, a weed may be a plant within a field of cultivated crops that is not the cultivated species. In another example, a weed may be a plant growing outside of or between cultivated rows of crops.

As used herein, "manipulating" an object may refer to performing an action on, interacting with, or altering the state of an object. For example, manipulating may comprise irradiating, illuminating, heating, burning, killing, moving, lifting, grabbing, spraying, or otherwise modifying an object.

As used herein, "electromagnetic radiation" may refer to radiation from across the electromagnetic spectrum. Electromagnetic radiation may include, but is not limited to, visible light, infrared light, ultraviolet light, radio waves, gamma rays, or microwaves.

Autonomous Weed Eradication Systems

The object tracking methods described herein may be implemented by an autonomous weed eradication system to target and eliminate weeds. Such tracking methods may facilitate object tracking relative to a moving body, such as a moving vehicle. For example, an autonomous weed eradication system may be used to track a weed of interest identified in images or representations collected by a first sensor, such as a prediction sensor, over time relative to the autonomous weed eradication system while the system is in motion relative to the weed. The tracking information may be used to determine a predicted location of the weed relative to the system at a later point in time. The autonomous weed eradication system may then locate the same weed in an image or representation collected by a second sensor, such as a targeting sensor, using the predicted location. In some embodiments, the first sensor is a prediction camera and the second sensor is a targeting camera. One or both of the first sensor and the second sensor may be moving relative to the weed. For example, the prediction camera may be coupled to and moving with the autonomous weed eradication system.

Targeting the weed may comprise precisely locating the weed using the targeting sensor, targeting the weed with a laser, and eradicating the weed by burning it with laser light, such as infrared light. The prediction sensor may be part of a prediction module configured to determine a predicted location of an object of interest, and the targeting sensor may be part of a targeting module configured to refine the predicted location of the object of interest to determine a target location and target the object of interest with the laser at the target location. The prediction module may be configured to communicate with the targeting module to coordinate a camera handoff using point to point targeting, as described herein. The targeting module may target the object at the predicted location. In some embodiments, the targeting module may use the trajectory of the object to dynamically target the object while the system is in motion such that the position of the targeting sensor, the laser, or both is adjusted to maintain the target.

An autonomous weed eradication system may identify, target, and eliminate weeds without human input. Optionally, the autonomous weed eradication system may be positioned on a self-driving vehicle or a piloted vehicle or may be a trailer pulled by another vehicle such as a tractor. As illustrated in FIG. 1, an autonomous weed eradication system may be part of or coupled to a vehicle 100, such as a tractor or self-driving vehicle. The vehicle 100 may drive through a field of crops 200, as illustrated in FIG. 2. As the vehicle 100 drives through the field 200 it may identify, target, and eradicate weeds in an unweeded section 210 of the field, leaving a weeded field 220 behind it. The object tracking methods described herein may be implemented by the autonomous weed eradication system to identify, target, and eradicate weeds while the vehicle 100 is in motion. The high precision of such tracking methods enables accurate targeting of weeds, such as with a laser, to eradicate the weeds without damaging nearby crops.

Detection Systems

In some embodiments, the object tracking methods described herein may be performed by a detection system. The detection system may comprise a prediction system and, optionally, a targeting system. In some embodiments, the detection system may be positioned on or coupled to a vehicle, such as a self-driving weeding vehicle or a laser weeding system trailer pulled by a tractor. The prediction system may comprise a prediction sensor configured to image a region of interest, and the targeting system may comprise a targeting sensor configured to image a portion of the region of interest. Imaging may comprise collecting a representation (e.g., an image) of the region of interest or the portion of the region of interest. In some embodiments, the prediction system may comprise a plurality of prediction sensors, enabling coverage of a larger region of interest. In some embodiments, the targeting system may comprise a plurality of targeting sensors.

The region of interest may correspond to a region of overlap between the targeting sensor field of view and the prediction sensor field of view. Such overlap may be contemporaneous or may be temporally separated. For example, the prediction sensor field of view encompasses the region of interest at a first time and the targeting sensor field of view encompasses the region of interest at a second time but not at the first time. Optionally, the detection system may move relative to the region of interest between the first time and the second time, facilitating temporally separated overlap of the prediction sensor field of view and the targeting sensor field of view.

In some embodiments the prediction sensor may have a wider field of view than the targeting sensor. The prediction system may further comprise an object identification module to identify an object of interest in a prediction image or representation collected by the prediction sensor. The object identification module may differentiate an object of interest from other objects in the prediction image.

The prediction module may determine a predicted location of the object of interest and may send the predicted location to the targeting system. The predicted location of the object may be determined using the object tracking methods described herein.

The targeting system may point the targeting sensor toward a desired portion of the region of interest predicted to contain the object, based on the predicted location received from the prediction system. In some embodiments, the targeting module may direct an implement toward the object. In some embodiments, the implement may perform an action on or manipulate the object. In some embodiments, the targeting module may use the trajectory of the object to dynamically target the object while the system is in motion such that the position of the targeting sensor, the implement, or both is adjusted to maintain the target.

An example of a detection system 300 is provided in FIG. 3. The detection system may be part of or coupled to a vehicle 100, such as a self-driving weeding vehicle or a laser weeding system trailer pulled by a tractor, that moves along a surface, such as a crop field 200. The detection system 300 includes a prediction module 310, including a prediction sensor with a prediction field of view 315, and a targeting module 320, including a targeting sensor with a targeting field of view 325. The targeting module may further include an implement, such as a laser, with a target area that overlaps with the targeting field of view 325. In some embodiments, the prediction module 310 is positioned ahead of the targeting module 320, along the direction of travel of the vehicle 100, such that the targeting field of view 325 overlaps with the prediction field of view 315 with a temporal delay. For example, the prediction field of view 315 at a first time may overlap with the targeting field of view 325 at a second time. In some embodiments, the prediction field of view 315 at the first time may not overlap with the targeting field of view 325 at the first time.

A detection system of the present disclosure may be used to target objects on a surface, such as the ground, a dirt surface, a floor, a wall, an agricultural surface (e.g., a field), a lawn, a road, a mound, a pile, or a pit. In some embodiments, the surface may be a non-planar surface, such as uneven ground, uneven terrain, or a textured floor. For example, the surface may be uneven ground at a construction site, in an agricultural field, or in a mining tunnel, or the surface may be uneven terrain containing fields, roads, forests, hills, mountains, houses, or buildings. The detection systems described herein may locate an object on a non-planar surface more accurately, faster, or within a larger area than a single sensor system or a system lacking an object matching module.

Alternatively or in addition, a detection system may be used to target objects that may be spaced from the surface they are resting on, such as a tree top distanced from its grounding point, and/or to target objects that may be locatable relative to a surface, for example, relative to a ground surface in air or in the atmosphere. In addition, a detection system may be used to target objects that may be moving relative to a surface, for example, a vehicle, an animal, a human, or a flying object.

Figure 4:
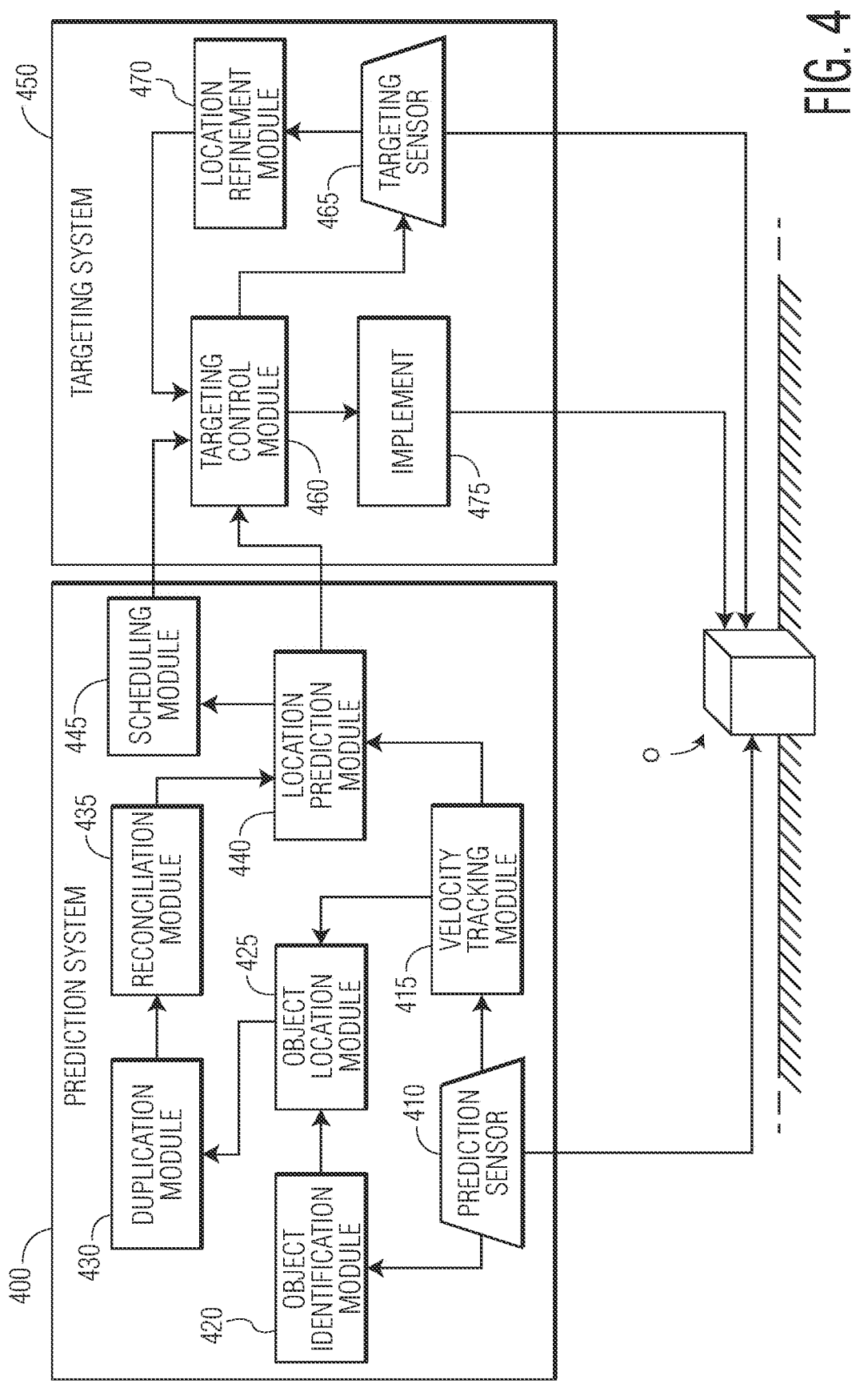
FIG. 4 is a block diagram depicting components of a prediction system and a targeting system for identifying, locating, targeting, and manipulating an object, in accordance with one or more embodiments herein.

FIG. 4 illustrates a detection system comprising a prediction system 400 and a targeting system 450 for tracking at targeting an object O relative to a moving body, such as vehicle 100 illustrated in FIG. 1-FIG. 3. The prediction system 400, the targeting system 450, or both may be positioned on or coupled to the moving body (e.g., the moving vehicle). The prediction system 400 may comprise a prediction sensor 410 configured to image a region, such as a region of a surface, containing one or more objects, including object O. Optionally, the prediction system 400 may include a velocity tracking module 415. The velocity tracking module may estimate a velocity of the moving body relative to the region (e.g., the surface). In some embodiments, the velocity tracking module 415 may comprise a device to measure the displacement of the moving body over time, such as a rotary encoder. Alternatively or in addition, the velocity tracking module may use images collected by the prediction sensor 400 to estimate the velocity using optical flow.

The object identification module 420 may identify objects in images collected by the prediction sensor. For example, the object identification module 420 may identify weeds in an image and may differentiate the weeds from other plants in the image, such as crops. The object location module 425 may determine locations of the objects identified by the object identification module 420 and to compile a set of identified objects and their corresponding locations. Object identification and object location may be performed on a series of images collected by the prediction sensor 410 over time. The set of identified objects and corresponding locations from in two or more images from the object location module 425 may be sent to the deduplication module 430.

The deduplication module 430 may use object locations in a first image collected at a first time and object locations in a second image collected at a second time to identify objects, such as object O, appearing in both the first image and the second image. The set of identified objects and corresponding locations may be deduplicated by the deduplication module 430 by assigning locations of an object appearing in both the first image and the second image to the same object O. In some embodiments, the deduplication module 430 may use a velocity estimate from the velocity tracking module 415 to identify corresponding objects appearing in both images. The resulting deduplicated set of identified objects may contain unique objects, each of which has one or more corresponding locations determined at one or more time points. The reconciliation module 435 may receive the deduplicated set of objects from the deduplication module 430 and may reconcile the deduplicated set by removing objects. In some embodiments, objects may be removed if they are no longer being tracked. For example, an object may be removed if it has not been identified in a predetermined number of images in the series of images. In another example, an object may be removed if it has not been identified in a predetermined period of time. In some embodiments, objects no longer appearing in images collected by the prediction sensor 410 may continue to be tracked. For example, an object may continue to be tracked if it is expected to be within the prediction field of view based on the predicted location of the object. In another example, an object may continue to be tracked if it is expected to be within range of a targeting system based on the predicted location of the object. The reconciliation module 435 may provide the reconciled set of objects to the location prediction module 440.

The location prediction module 440 may determine a predicted location at a future time of object O from the reconciled set of objects. In some embodiments, the predicted location may be determined from two or more corresponding locations determined from images collected at two or more time points or from a single location combined with velocity information from the velocity tracking module 415. The predicted location of object O may be based on a vector velocity, including speed and direction, of object O relative to the moving body between the location of object O in a first image collected at a first time and the location of object O in a second image collected at a second time. Optionally, the vector velocity may account for a distance of the object O from the moving body along the imaging axis (e.g., a height or elevation of the object relative to the surface). Alternatively or in addition, the predicted location of the object may be based on the location of object O in the first image or in the second image and a vector velocity of the vehicle determined by the from the velocity tracking module 415.

The targeting system 450 may receive the predicted location of the object O at a future time from the prediction system 400 and may use the predicted location to precisely target the object with an implement 475 at the future time. The targeting control module 460 of the targeting system 450 may receive the predicted location of object O from the location prediction module 440 of the prediction system 435 and may instruct the targeting sensor 465, the implement 475, or both to point toward the predicted location of the object. Optionally, the targeting sensor 465 may collect an image of object O, and the location refinement module 470 may refine the predicted location of object O based on the location of object O determined from the image. In some embodiments, the location refinement module 470 may account for optical distortions in images collected by the prediction sensor 410 or the targeting sensor 465, or for distortions in angular motions of the implement 475 or the targeting sensor 465 due to nonlinearity of the angular motions relative to object O. The targeting control module 460 may instruct the implement 475, and optionally the targeting sensor 465, to point toward the refined location of object O. In some embodiments, the targeting control module 460 may adjust the position of the targeting sensor 465 or the implement 475 to follow the object to account for motion of the vehicle while targeting. The implement 475, such as a laser, may then manipulate object O. For example, a laser may direct infrared light toward the predicted or refined location of object O. Object O may be a weed and directing infrared light toward the location of the weed may eradicate the weed.

In some embodiments, a prediction system 400 may further comprise a scheduling module 445. The scheduling module 445 may select objects identified by prediction module and schedule which ones to target with the targeting system. The scheduling module 445 may schedule objects for targeting based on parameters such as object location, relative velocity, implement activation time, confidence score, or combinations thereof. For example, the scheduling module 445 may prioritize targeting objects predicted to move out of a field of view of a prediction sensor or a targeting sensor or out of range of an implement. Alternatively or in addition, a scheduling module 445 may prioritize targeting objects identified or located with high confidence. Alternatively or in addition, a scheduling module 445 may prioritize targeting objects with short activation times. In some embodiments, a scheduling module 445 may prioritize targeting objects based on a user's preferred parameters.

Prediction Modules

A prediction module of the present disclosure may be configured to track objects relative to a moving body using the tracking methods described herein. In some embodiments, a prediction module is configured to capture an image or representation of a region of a surface using the prediction camera or prediction sensor, identify an object of interest in the image, and determine a predicted location of the object.

The prediction module may include an object identification module configured to identify an object of interest and differentiate the object of interest from other objects in the prediction image. In some embodiments, the prediction module uses a machine learning model to identify and differentiate objects based on features extracted from a training dataset comprising labeled images of objects. For example, the machine learning model of or associated with the object identification module may be trained to identify weeds and differentiate weeds from other plants, such as crops. In another example, the machine learning model of or associated with the object identification module may be trained to identify debris and differentiate debris from other objects. The object identification module may be configured to identify a plant and to differentiate between different plants, such as between a crop and a weed. In some embodiments, the machine learning model may be a deep learning model, such as a deep learning neural network.

In some embodiments, the object identification module comprises using an identification machine learning model, such as a convolutional neural network. The identification machine learning model may be trained with many images, such as high-resolution images, for example of surfaces with or without objects of interest. For example, the machine learning model may be trained with images of fields with or without weeds. Once trained, the machine learning model may be configured to identify a region in the image containing an object of interest. The region may be defined by a polygon, for example a rectangle. In some embodiments, the region is a bounding box. In some embodiments, the region is a polygon mask covering an identified region. In some embodiments, the identification machine learning model may be trained to determine a location of the object of interest, for example a pixel location within a prediction image.

The prediction module may further comprise a velocity tracking module to determine the velocity of a vehicle to which the prediction module is coupled. In some embodiments, the positioning system and the detection system may be positioned on the vehicle. Alternatively or in addition, the positioning system may be positioned on a vehicle that is spatially coupled to the detection system. For example, the positioning system may be located on a vehicle pulling the detection system. The velocity tracking module may comprise a positioning system, for example a wheel encoder or rotary encoder, an Inertial Measurement Unit (IMU), a Global Positioning System (GPS), a ranging sensor (e.g., laser, SONAR, or RADAR), or an Internal Navigation System (INS). For example, a wheel encoder in communication with a wheel of the vehicle may estimate a velocity or a distance traveled based on angular frequency, rotational frequency, rotation angle, or number of wheel rotations. In some embodiments, the velocity tracking module may utilize images from the prediction sensor to determine the velocity of the vehicle using optical flow.

The prediction module may comprise a system controller, for example a system computer having storage, random access memory (RAM), a central processing unit (CPU), and a graphics processing unit (GPU). The system computer may comprise a tensor processing unit (TPU). The system computer should comprise sufficient RAM, storage space, CPU power, and GPU power to perform operations to detect and identify a target. The prediction sensor should provide images of sufficient resolution on which to perform operations to detect and identify an object. In some embodiments, the prediction sensor may be a camera, such as a charge-coupled device (CCD) camera or a complementary metal-oxide-semiconductor (CMOS) camera, a LIDAR detector, an infrared sensor, an ultraviolet sensor, an x-ray detector, or any other sensor capable of generating an image.

Targeting Modules

A targeting module of the present disclosure may be configured to target an object tracked by a prediction module. In some embodiments, the targeting module may direct an implement toward the object to manipulate the object. For example, the targeting module may be configured to direct a laser beam toward a weed to burn the weed. In another example, the targeting module may be configured to direct a grabbing tool to grab the object. In another example, the targeting module may direct a spraying tool to spray fluid at the object. In some embodiments, the object may be a weed, a plant, an insect, a pest, a field, a piece of debris, an obstruction, a region of a surface, or any other object that may be manipulated. The targeting module may be configured to receive a predicted location of an object of interest from the prediction module and point the targeting camera or targeting sensor toward the predicted location. In some embodiments, the targeting module may direct an implement, such as a laser, toward the predicted location. The position of the targeting sensor and the position of the implement may be coupled. In some embodiments, a plurality of targeting modules are in communication with the prediction module.

The targeting module may comprise a targeting control module. In some embodiments, the targeting control module may control the targeting sensor, the implement, or both. In some embodiments, the targeting control module may comprise an optical control system comprising optical components configured to control an optical path (e.g., a laser beam path or a camera imaging path). The targeting control module may comprise software-driven electrical components capable of controlling activation and deactivation of the implement. Activation or deactivation may depend on the presence or absence of an object as detected by the targeting camera. Activation or deactivation may depend on the position of the implement relative to the target object location. In some embodiments, the targeting control module may activate the implement, such as a laser emitter, when an object is identified and located by the prediction system. In some embodiments, the targeting control module may activate the implement when the range or target area of the implement is positioned to overlap with the target object location.

The targeting control module may deactivate the implement once the object has been manipulated, such as grabbed, sprayed, burned, or irradiated; the region comprising the object has been targeted with the implement; the object is no longer identified by the target prediction module; a designated period of time has elapsed; or any combination thereof. For example, the targeting control module may deactivate the emitter once a region on the surface comprising a weed has been scanned by the beam, once the weed has been irradiated or burned, or once the beam has been activated for a pre-determined period of time.

The prediction modules and the targeting modules described herein may be used in combination to locate, identify, and target an object with an implement. The targeting control module may comprise an optical control system as described herein. The prediction module and the targeting module may be in communication, for example electrical or digital communication. In some embodiments, the prediction module and the targeting module are directly or indirectly coupled. For example, the prediction module and the targeting module may be coupled to a support structure. In some embodiments, the prediction module and the targeting module are configured on or coupled to a vehicle, such as the vehicle shown in FIG. 1 and FIG. 2. For example, the prediction module and the targeting module may be positioned on a self-driving vehicle. In another example, the prediction module and the targeting module may be positioned on a trailer pulled by another vehicle, such as a tractor.

The targeting module may comprise a system controller, for example a system computer having storage, random access memory (RAM), a central processing unit (CPU), and a graphics processing unit (GPU). The system computer may comprise a tensor processing unit (TPU). The system computer should comprise sufficient RAM, storage space, CPU power, and GPU power to perform operations to detect and identify a target. The targeting sensor should provide images of sufficient resolution on which to perform operations to match an object to an object identified in a prediction image.

Object Tracking Methods

The systems of the present disclosure, such as the detections systems, the optical control systems, the autonomous weed eradication systems, and the computer systems described herein, implement an object tracking method to track one or more objects relative to a moving body (e.g., vehicle 100 illustrated in FIG. 1-FIG. 3). An object tracking method may be used to identify and locate objects within an image collected by a sensor (e.g., a prediction sensor), match same objects identified across two or more images, determine trajectories of objects relative to a moving body (e.g., a moving vehicle), predict future locations of objects, or combinations thereof. In some embodiments, an object may be a weed. Exemplary applications of object tracking methods are described with respect to tracking weeds on a surface. However, these methods may be applied to any other object or group of objects, such as plants, debris, insects, pests, or other objects.

Figure 5:
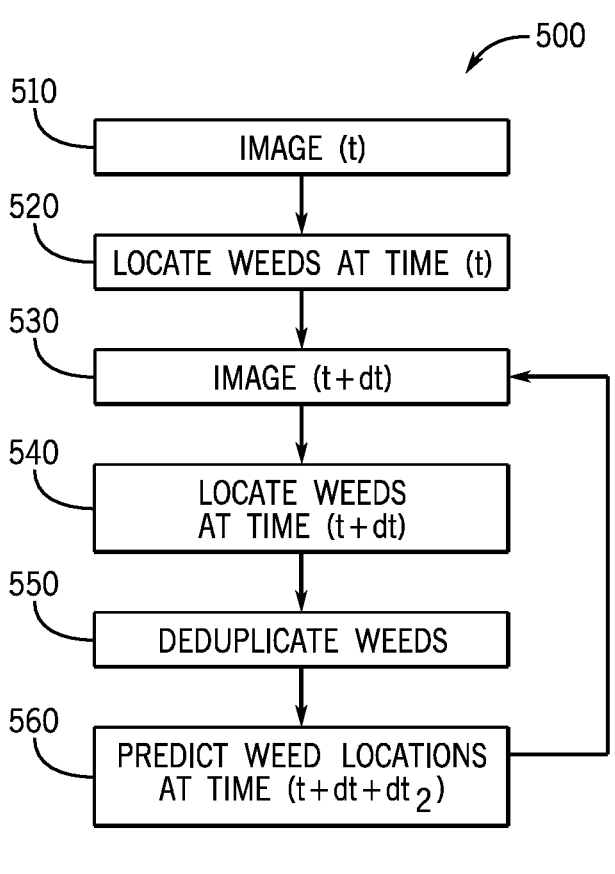
FIG. 5 is a flowchart illustrating a procedure for predicting a location of a weed, in accordance with one or more embodiments herein.

A method 500 to predict a location of a weed relative to a moving body, such as vehicle 100 illustrated in FIG. 1-FIG. 3, at a future time is illustrated in FIG. 5. In step 510 a first image may be collected at a first point in time, time (t). The first image may be collected with a sensor, such as a prediction sensor, that may be positioned on or coupled to the moving body (e.g., the moving vehicle). Weeds may be identified within the first image, and their locations at time (t) may be determined in step 520. A second image taken at time (t+dt) may be collected at step 530. In some embodiments, dt may be positive, such that the second image is collected after the first image. In some embodiments, dt may be negative, such that the second image is collected before the first image. The second image may be collected using the same sensor as the first image. At step 540, weeds within the second image may be identified, and their locations at time (t+dt) may be determined. Deduplication may be performed at step 550 to identify any weeds appearing in both the first image and the second image and to associate the locations of such weeds at time (t) and at time (t+dt) with the corresponding weed. The locations at time (t) and time (t+dt) of a weed identified in both the first image and the second image, as determined in deduplication step 550, may be used to determine a future location of the weed at a later point in time (t+dt+dt$_2$) at step 560. Alternatively or in addition, a single location of a weed at time (t) or at time (t+dt) may be used in combination with a velocity vector of the moving body to determine the future location of the weed. This future location may be used to target the weed at the later point in time, for example using a laser to eradicate the weed. In some embodiments, the predicted location of the weed may comprise a trajectory of the weed relative to the moving body. The trajectory may enable dynamic tracking of the weed over time as it moves relative to the moving body.

Deduplication and Reconciliation

As described herein, deduplication may comprise pairing or matching locations of an object (e.g., a weed) identified across two or more images such that the locations of the object in each of the two or more images are associated with the same object. Reconciliation may comprise removing tracked objects that are no longer present in the images. For example, reconciliation may comprise removing tracked objects that have moved out of the field of view of the sensor. In some embodiments, tracked objects may be removed if they are absent for multiple image frames or if the predicted location of the object is outside the field of view at the time of image collection. In some embodiments, a tracked object may not be removed if the object is predicted to be within the field of view despite not being identified in the image. For example, an object may not be identified in an image if it is obscured at the time of image collection or if software used to identify objects is unable to detect or recognize the object in the image.

Figure 6:
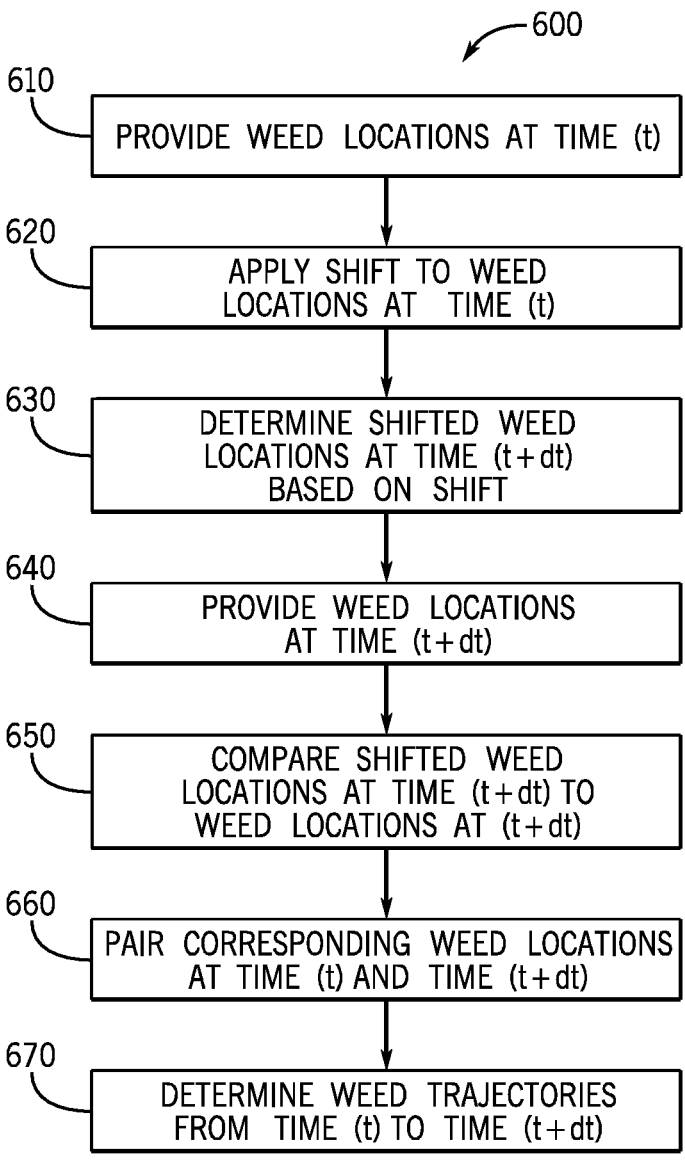
FIG. 6 is a flowchart illustrating a procedure for deduplicating weeds identified in a series of images and predicting weed locations, in accordance with one or more embodiments herein.

Deduplication 550 of FIG. 5 are described in greater detail with respect to FIG. 6, which describes method 600 to determine trajectories of weeds relative to a moving body, such as vehicle 100 illustrated in FIG. 1-FIG. 3. Weed locations at time (t), such as those determined in step 520 of FIG. 5, are provided at step 610. At step 620 a shift may be applied to the weed locations at time (t) to determine shifted weed locations at time (t+dt) in step 630. In some embodiments, the shift may be based on a measured or estimated displacement of the moving body (e.g., the moving vehicle) relative to the weeds over the time period (dt) from time (t) to time (t+dt), as described in greater detail in FIG. 7. For example, the displacement of the moving body may be estimated using optical flow analysis of images collected by a sensor coupled to the moving body, or displacement of the moving body may be measured using a rotary encoder or a GPS tracking device. Alternatively or in addition, the shift may be based on a displacement between a first weed identified in a first image and a second weed identified in the second image, as described in greater detail in FIG. 8A-FIG. 8C. In some embodiments, the shift may be a sum of multiple shifts. For example, a first shift may be applied based on a measured or estimated displacement of the moving body relative to the weeds over the time period (dt) from time (t) to time (t+dt) to produce intermediate shifted locations. In some embodiments, dt may be positive, such that time (t+dt) is after time (t). In some embodiments, dt may be negative, such that time (t+dt) is before time (t). A second shift may be applied based on a displacement between an intermediate shifted location and a weed located in the second image. Weed locations at time (t+dt), such as those determined in step 540 of FIG. 5, are provided at step 640. The shifted weed locations at time (t+dt), determined from applying the shift to the weed locations at time (t), are compared to the actual weed locations at time (t+dt) in step 650.

In some embodiments, the comparison performed at step 650 may comprise comparing shifted locations to each of the closest actual weed locations at time (t+dt) to determine whether the weed corresponding to the shifted location identified in the first image is the same as the weed corresponding to the actual weed location at time (t+dt) identified the second image. Alternatively or in addition, this comparison may comprise identifying any actual weed locations at time (t+dt) within a predetermined search radius of each shifted location to determine whether the weed corresponding to the shifted location identified in the first image is the same as the weed corresponding to the actual weed location identified the second image and located within the search radius. Based on this comparison, at step 660 a weed location in the first image is paired with a weed location in the second image, corresponding to locations at times (t) and (t+dt), respectively, of the same weed. This pairing process is used to deduplicate a set of weeds identified in the first image and/or in the second image. Trajectories relative to the moving body may be determined at step 670 for weeds identified in both the first image and the second image, therefore having corresponding locations at time (t) and time (t+dt). In some embodiments, a trajectory may comprise a displacement in one, two, or three dimensions over the time period (dt) from time (t) to time (t+dt). The trajectory may be used to predict a future location of the weed at a later time (t+dt+dt$_2$), as described in step 560 of FIG. 5.

Matching or pairing of objects across images for deduplication may be performed by various methods. In some embodiments, an object may be identified across multiple images based on proximity to a location where the object is expected to be. An example of such a method is described in greater detail with respect to FIG. 7. In some embodiments, an object may be identified across multiple images by applying multiple displacements or shifts to a set of objects, identifying the displacement or shift that produces the lowest error (e.g., deviation from observed object locations), and matching objects based on proximity to the shifted locations. An example of such a method is described in greater detail with respect to FIG. 8A-FIG. 8C.

Figure 7:
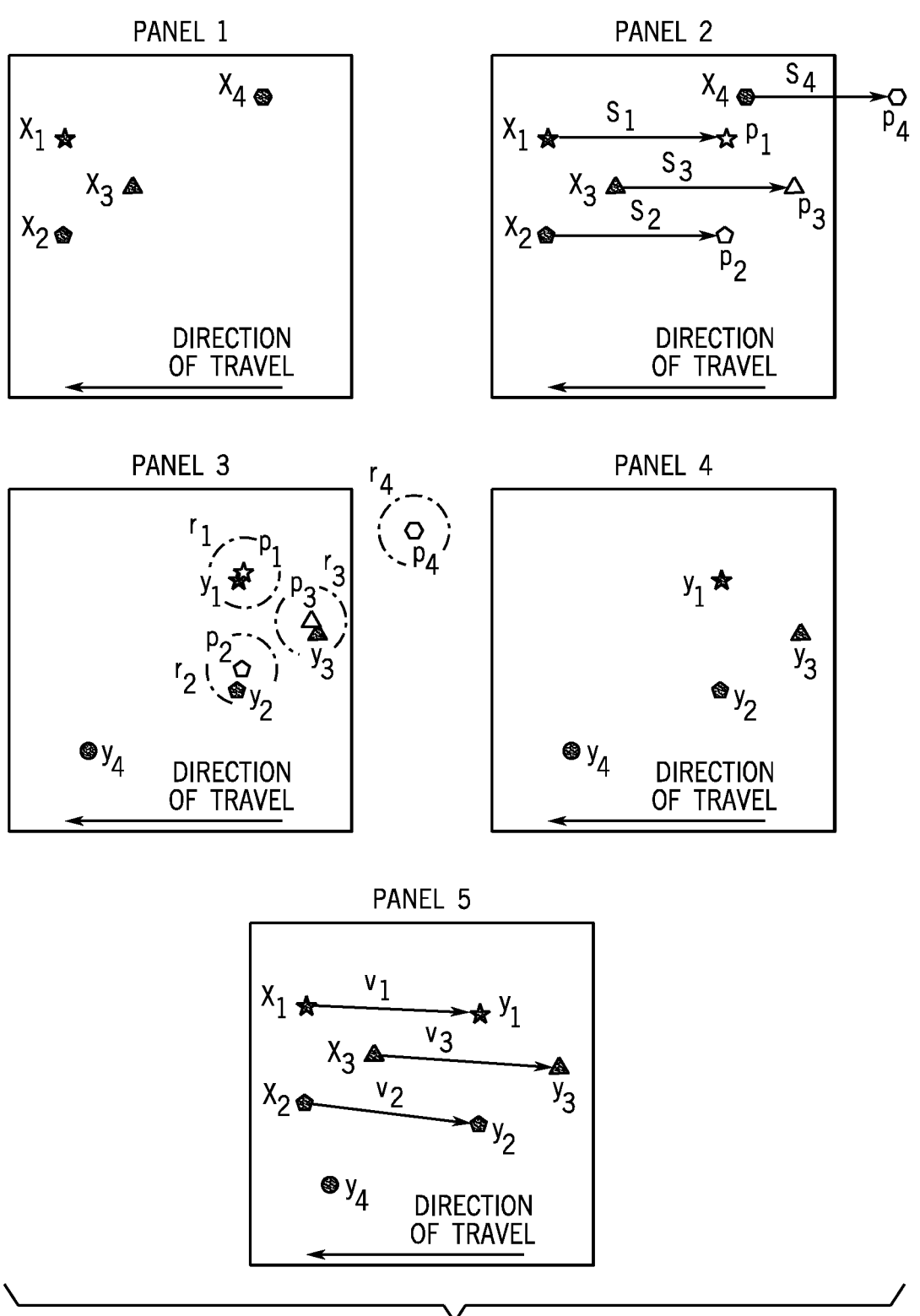
FIG. 7 illustrates a procedure for deduplicating weeds identified in a series of images and predicting weed locations, in accordance with one or more embodiments herein.

FIG. 7 illustrates an example of a method for deduplicating images as described in method 600 of FIG. 6. Schematically illustrated in Panel 1 of FIG. 7 is a first image of a surface collected at time (t) containing weeds at locations $x_1$, $x_2$, $x_3$, and $x_4$, shown as a shaded star, pentagon, triangle, and hexagon, respectively. The direction of travel of a moving body (e.g., a vehicle, such as an autonomous vehicle or towed trailer) from which the image was collected relative to the surface is indicated by a left-pointing arrow. In Panel 2, shifts $s_1$, $s_2$, $s_3$, and $s_4$ are applied to each of the weeds at locations $x_1$, $x_2$, $x_3$, and $x_4$, respectively, to yield shifted locations $p_1$, $p_2$, $p_3$, and $p_4$, shown as an unfilled star, pentagon, triangle, and hexagon, respectively. The shifts $s_1$, $s_2$, $s_3$, and $s_4$ are determined based on a measured or estimated velocity of the moving body relative to the surface over the time period (dt) from time (t) to time (t+dt). In this example, each of shifts $s_1$, $s_2$, $s_3$, and $s_4$ are the same in magnitude and direction. In some embodiments, each of shifts $s_1$, $s_2$, $s_3$, and $s_4$ may be a sum of two or more shifts. For example, the first shift may be determined based on a measured or estimated velocity of the moving body and the second shift may be based on a distance between an intermediate shifted position and an actual weed location $y_1$, $y_2$, $y_3$, or $y_4$, at time (t+dt). The shifted locations $p_1$, $p_2$, $p_3$, and $p_4$ represent estimations of where each of the weeds at locations $x_1$, $x_2$, $x_3$, and $x_4$ will be at time (t+dt).

Panel 3 schematically illustrates a second image collected at time (t+dt) containing weeds at locations $y_1$, $y_2$, $y_3$, and $y_4$, shown as a shaded star, pentagon, triangle, and circle, respectively, overlaid with shifted locations $p_1$, $p_2$, $p_3$, and $p_4$ determined in Panel 2. Also shown in Panel 3 are search regions $r_1$, $r_2$, $r_3$, and $r_4$ around shifted locations $p_1$, $p_2$, $p_3$, and $p_4$. Each search region surrounds a corresponding shifted location. Locations of weeds at time (t+dt) located within a search region are attributed to the same weed as the corresponding shifted location. For example, the weed at location $y_1$ (shaded star) is located within search region $r_1$, which corresponds to shifted location $p_1$ (unfilled star), so the weed at location $y_1$ is identified as the same weed as the weed at location $x_1$ located in the first image illustrated in Panel 1. Similarly, the weed at location $y_2$ is determined to be the same as the weed at location $x_2$, and the weed at location $y_3$ is determined to be the same as the weed at location $x_3$. The weed at location $y_4$ does not correspond to any shifted location, so the weed at location $y_4$ was identified as a new weed that does not correspond to a weed identified in the first image. Shifted location $p_4$ does not correspond to a weed identified in the second image collected at time (t+dt), so the weed at location $x_4$ is determined to not be identified in the second image. Alternatively or in addition, search regions may be applied around weeds at locations $y_1$, $y_2$, $y_3$, and $y_4$, and shifted locations falling within the search regions may be attributed to the same weed as the corresponding weed location. In some embodiments, a weed identified in the first image may not be identified in the second image if the moving body has moved such that the weed is no longer within the field of view of the sensor when the second image is collected. Alternatively, the weed identified in the first image may not be identified in the second image if the weed is obscured in the second image, such as by another plant. Image reconciliation may comprise removing weeds no longer being tracked. For example, an object may be removed if it has not been identified in a predetermined number of images in the series of images. In another example, an object may be removed if it has not been identified in a predetermined period of time. In some embodiments, objects no longer appearing in images collected by the prediction sensor may continue to be tracked for targeting.

Panel 4 illustrates a deduplicated and reconciled image containing weeds at locations $y_1$, $y_2$, and $y_3$, which correspond to the weeds at locations $x_1$, $x_2$, and $x_3$, respectively, and a weed at location $y_4$, corresponding to a newly identified weed. Vector trajectories $v_1$, $v_2$, and $v_3$ between weed locations $x_1$, $x_2$, and $x_3$ at time (t) and weed locations $y_1$, $y_2$, and $y_3$ at time (t+dt) are illustrated in Panel 5. Since the weed at location $y_4$ does not have a corresponding location at time (t), no vector trajectory is determined. Unlike shifts $s_1$, $s_2$, and $s_3$, vector trajectories $v_1$, $v_2$, and $v_3$ may not be the same due to various factors including differences in weed height (i.e., perpendicular to the image plane), rotation of the moving body relative to the surface from time (t) to time (t+dt), optical distortions, or changes in weed shape from time (t) to time (t+dt). Furthermore, vector trajectories $v_1$, $v_2$, and $v_3$ may differ from shifts $s_1$, $s_2$, and $s_3$, respectively, due to inaccuracies in estimating or measuring the velocity of the moving body, rotary encoder wheel slipping, height of the corresponding weeds relative to the surface, rotation of the moving body relative to the surface from time (t) to time (t+dt), optical distortions, movement of the weed relative to the surface, or changes in weed shape from time (t) to time (t+dt). The vector trajectories $v_1$, $v_2$, and $v_3$ may be used to predict locations of the corresponding weeds at later points in time.

Figure 8A:
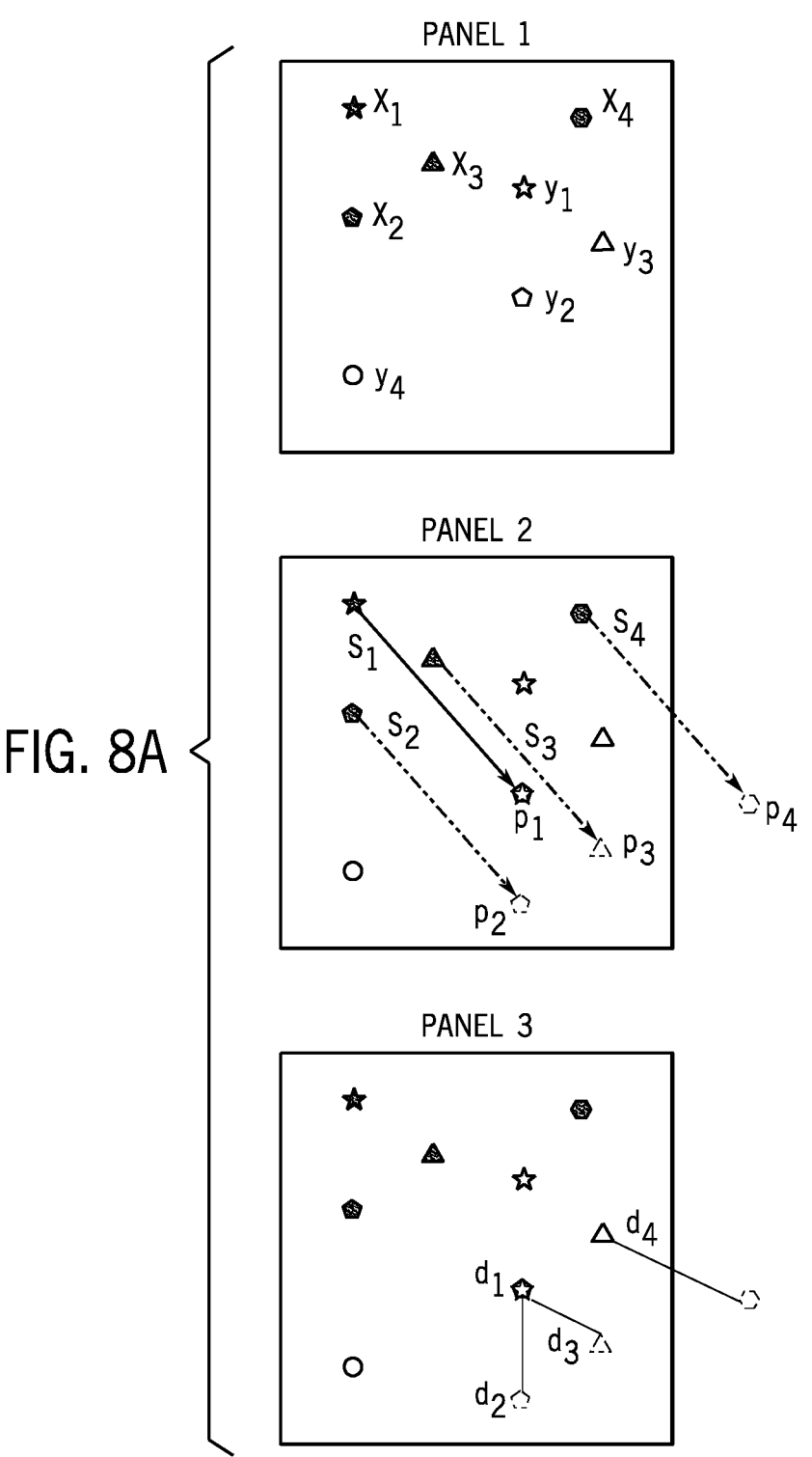
FIG. 8A, FIG. 8B, and FIG. 8C illustrate a procedure for deduplicating weeds identified in a series of images, in accordance with one or more embodiments herein.
Figure 8B:
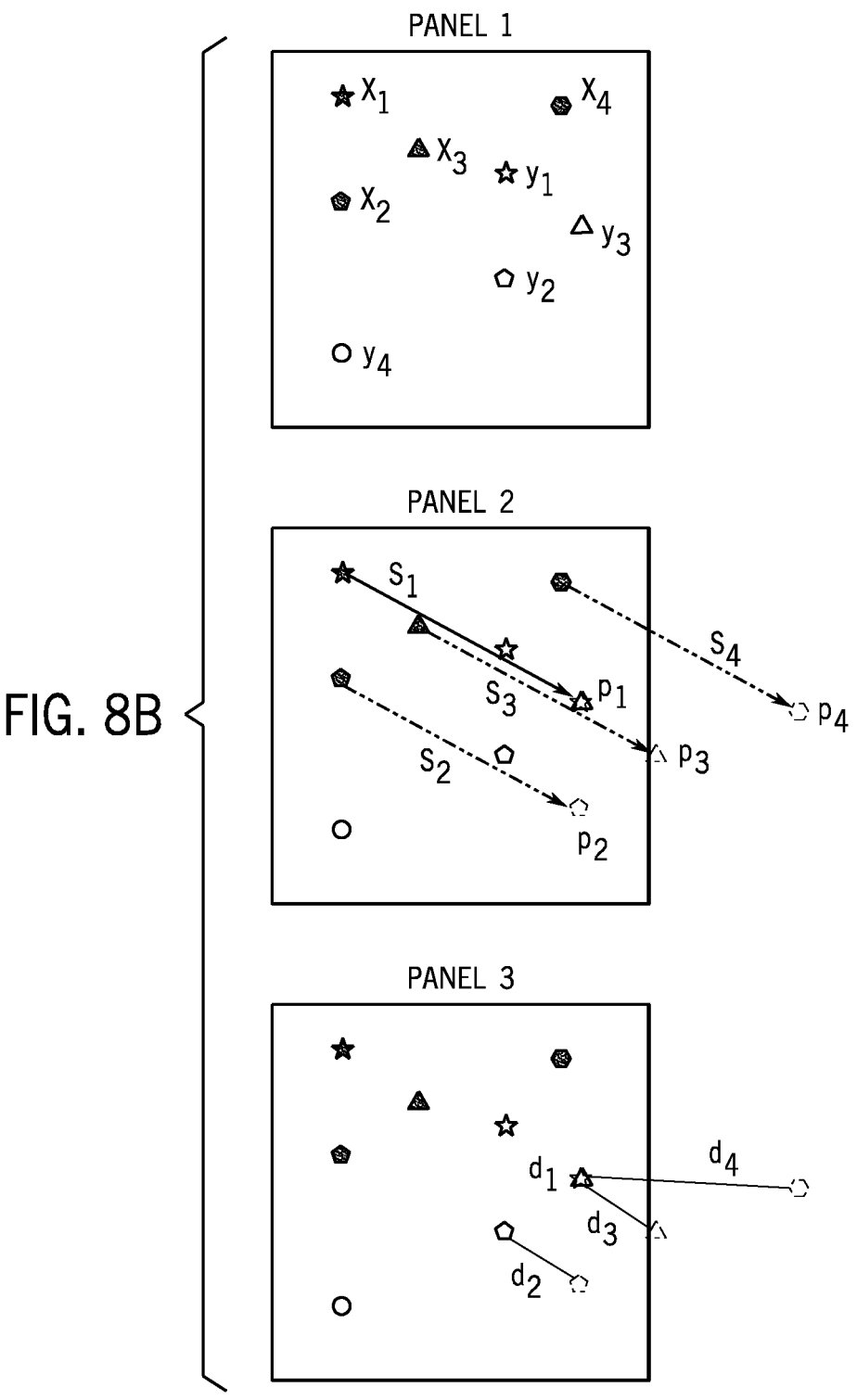
Figure 8C:
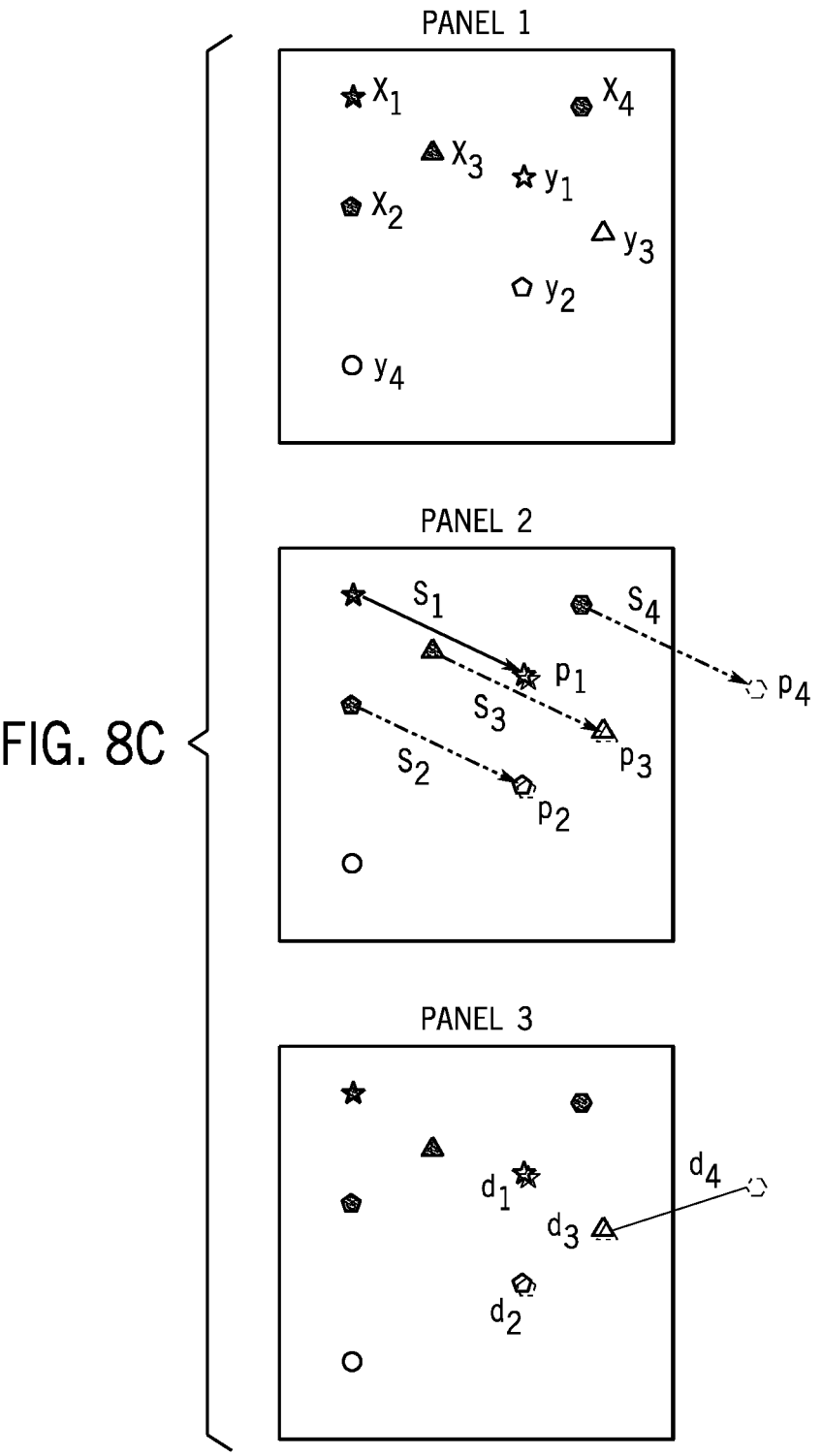

FIG. 8A-FIG. 8C illustrate a second example of a method for deduplicating images as described in method 600 of FIG. 6. Application of different test shifts to weeds identified in an image to determine a shift with the lowest offset are shown in each of FIG. 8A, FIG. 8B, and FIG. 8C. FIG. 8A illustrates application of a first test shift. Schematically illustrated in Panel 1 are a first image collected at time (t) containing weeds at locations $x_1$, $x_2$, $x_3$, and $x_4$, shown as shaded star, pentagon, triangle, and hexagon, respectively, and a second image collected at time (t+dt) containing weeds at locations $y_1$, $y_2$, $y_3$, and $y_4$, shown as unfilled star, pentagon, triangle, and circle, respectively. In some embodiments, weed locations $x_1$, $x_2$, $x_3$, and $x_4$ at time (t) may be predicted weed locations determined using the methods described herein rather than weed locations determined from an image; in such cases (dt) may be zero such that (t) is equal to (t+dt), or (dt) may be greater than zero or less than zero.

In Panel 2, shifts $s_1$, $s_2$, $s_3$, and $s_4$ are applied to $x_1$, $x_2$, $x_3$, and $x_4$, to yield corresponding shifted locations $p_1$, $p_2$, $p_3$, and $p_4$, shown as a broken star, pentagon, triangle, and hexagon, respectively. The shifts are based on a vector displacement ($s_1$, shown as a solid arrow) between location $x_1$ (shaded star) and location $y_2$ (unfilled pentagon). The same shifts ($s_2$, $s_3$, and $s_4$, shown as broken arrows) are applied to weeds at locations $x_2$, $x_3$, and $x_4$. Shifted locations $p_1$, $p_2$, $p_3$, and $p_4$ are compared to weed locations $y_1$, $y_2$, $y_3$, and $y_4$ at time (t+dt) in Panel 3. An offset is determined based on the distances $d_1$, $d_2$, $d_3$, and de of each of shifted locations $p_1$, $p_2$, $p_3$, and $p_4$ from the closest weed at time (t+dt). For example, shifted location $p_2$ (broken pentagon) is closest to the weed at location $y_2$ (unfilled pentagon), and the resulting distance is $d_2$. Similarly, shifted location $p_3$ is closest to the weed at location $y_2$, and the resulting distance is $d_3$; and shifted location $p_4$ is closest to the weed at location $y_3$, at the resulting distance is $d_4$. Since the shifts were based on the distance between location $x_1$ and location $y_2$, shifted location $p_1$ is aligned with location $y_2$, and the resulting distance $d_1$ is zero. The offset is determined based on distances $d_1$, $d_2$, $d_3$, and $d_4$. For example, the offset may be a sum of $d_1$, $d_2$, $d_3$, and da, an average of $d_1$, $d_2$, $d_3$, and de, or a combination of $d_1$, $d_2$, $d_3$, and $d_4$.

FIG. 8B illustrates application of a second test shift. Schematically illustrated in Panel 1 are a first image collected at time (t) containing weeds at locations $x_1$, $x_2$, $x_3$, and $x_4$, shown as shaded star, pentagon, triangle, and hexagon, respectively, and a second image collected at time (t+dt) containing weeds at locations $y_1$, $y_2$, $y_3$, and $y_4$, shown as unfilled star, pentagon, triangle, and circle, respectively. In some embodiments, weed locations $x_1$, $x_2$, $x_3$, and $x_4$ at time (t) may be predicted weed locations determined using the methods described herein rather than weed locations determined from an image; in such cases (dt) may be zero such that (t) is equal to (t+dt), or (dt) may be greater than zero or less than zero.

In Panel 2, shifts $s_1$, $s_2$, $s_3$, and $s_4$ are applied to $x_1$, $x_2$, $x_3$, and $x_4$, to yield corresponding shifted locations $p_1$, $p_2$, $p_3$, and $p_4$, shown as a broken star, pentagon, triangle, and hexagon, respectively. The shifts are based on a vector displacement ($s_1$, shown as a solid arrow) between location $x_1$ (shaded star) and location $y_3$ (unfilled triangle). The same shifts ($s_2$, $s_3$, and $s_4$, shown as broken arrows) are applied to weeds at locations $x_2$, $x_3$, and $x_4$. Shifted locations $p_1$, $p_2$, $p_3$, and $p_4$ are compared to weed locations $y_1$, $y_2$, $y_3$, and $y_4$ at time (t+dt) in Panel 3. An offset is determined based on the distances $d_1$, $d_2$, $d_3$, and de of each of shifted locations $p_1$, $p_2$, $p_3$, and $p_4$ from the closest weed at time (t+dt). For example, shifted location $p_2$ (broken pentagon) is closest to the weed at location $y_2$ (unfilled pentagon), and the resulting distance is $d_2$. Similarly, shifted location $p_3$ is closest to the weed at location $y_3$, and the resulting distance is $d_3$; and shifted location $p_4$ is closest to the weed at location $y_3$, at the resulting distance is $d_4$. Since the shifts were based on the distance between location $x_1$ and location $y_3$, shifted location $p_1$ is aligned with location $y_3$, and the resulting distance $d_1$ is zero. The offset is determined based on distances $d_1$, $d_2$, $d_3$, and $d_4$. For example, the offset may be a sum of $d_1$, $d_2$, $d_3$, and $d_4$, an average of $d_1$, $d_2$, $d_3$, and $d_4$, or a combination of $d_1$, $d_2$, $d_3$, and $d_4$.

FIG. 8C illustrates application of a third test shift. Schematically illustrated in Panel 1 are a first image collected at time (t) containing weeds at locations $x_1$, $x_2$, $x_3$, and $x_4$, shown as shaded star, pentagon, triangle, and hexagon, respectively, and a second image collected at time (t+dt) containing weeds at locations $y_1$, $y_2$, $y_3$, and $y_4$, shown as unfilled star, pentagon, triangle, and circle, respectively. In some embodiments, weed locations $x_1$, $x_2$, $x_3$, and $x_4$ at time (t) may be predicted weed locations determined using the methods described herein rather than weed locations determined from an image; in such cases (dt) may be zero such that (t) is equal to (t+dt), or (dt) may be greater than zero or less than zero.

In Panel 2, shifts $s_1$, $s_2$, $s_3$, and $s_4$ are applied to $x_1$, $x_2$, $x_3$, and $x_4$, to yield corresponding shifted locations $p_1$, $p_2$, $p_3$, and $p_4$, shown as a broken star, pentagon, triangle, and hexagon, respectively. The shifts are based on a vector displacement ($s_1$, shown as a solid arrow) between location $x_1$ (shaded star) and location $y_1$ (unfilled star). The same shifts ($s_2$, $s_3$, and $s_4$, shown as broken arrows) are applied to weeds at locations $x_2$, $x_3$, and $x_4$. Shifted locations $p_1$, $p_2$, $p_3$, and $p_4$ are compared to weed locations $y_1$, $y_2$, $y_3$, and $y_4$ at time (t+dt) in Panel 3. An offset is determined based on the distances $d_1$, $d_2$, $d_3$, and de of each of shifted locations $p_1$, $p_2$, $p_3$, and $p_4$ from the closest weed at time (t+dt). For example, shifted location $p_2$ (broken pentagon) is closest to the weed at location $y_2$ (unfilled pentagon), and the resulting distance is $d_2$. Similarly, shifted location $p_3$ is closest to the weed at location $y_3$, and the resulting distance is $d_3$; and shifted location $p_4$ is closest to the weed at location $y_3$, at the resulting distance is $d_4$. Since the shifts were based on the distance between location $x_1$ and location $y_3$, shifted location $p_1$ is aligned with location $y_3$, and the resulting distance $d_1$ is zero. Furthermore, since shifted locations $p_2$ and $p_3$ are closely aligned with locations $y_2$ and $y_3$, respectively, distances $d_2$ and $d_3$ are small. The offset is determined based on distances $d_1$, $d_2$, $d_3$, and $d_4$. For example, the offset may be a sum of $d_1$, $d_2$, $d_3$, and $d_4$, an average of $d_1$, $d_2$, $d_3$, and $d_4$, or a combination of $d_1$, $d_2$, $d_3$, and $d_4$.

Offsets resulting from the test shifts applied in FIG. 8A, FIG. 8B, and FIG. 8C are compared to determine the shift that results in the smallest offset. In some embodiments, offsets resulting from test shifts corresponding to displacements between pairings of a weed identified in the first image and a weed identified in the second image are compared. In some embodiments, shifts corresponding to all possible weed pairings are compared. In some embodiments, pairings are selected based on proximity of an expected location of a weed identified in the first image and an actual location of a weed identified in the second image. In this example, the test shift applied in FIG. 8C produces the smallest offset. A refined shift, which in this example corresponds to the shift shown in FIG. 8C, is applied to the weed locations in the first image, and the resulting shifted locations are compared to the weed locations in the second image, as described with respect to Panel 2 and Panel 3 of FIG. 8C.

The images are deduplicated by identifying weed locations from the first image and weed locations from the second image that correspond to the same weed based on distances between weed locations in the second image and the shifted locations. In this example, the weeds at locations $x_1$, $x_2$, and $x_3$ are identified as the same weeds located at locations $y_1$, $y_2$, and $y_3$, respectively. The weed at location $y_4$ (unfilled circle) is identified as a new weed present in the second image but not in the first image, and the weed at location $x_4$ is determined to not be identified in the second image. In some embodiments, a weed identified in the first image may not be identified in the second image if the moving body has moved such that the weed is no longer within the field of view of the sensor when the second image is collected. Alternatively, the weed identified in the first image may not be identified in the second image if the weed is obscured in the second image, such as by another plant. Image reconciliation may comprise removing weeds no longer being tracked. For example, an object may be removed if it has not been identified in a predetermined number of images in the series of images. In another example, an object may be removed if it has not been identified in a predetermined period of time. In some embodiments, objects no longer appearing in images collected by the prediction sensor may continue to be tracked. For example, an object may continue to be tracked if it is expected to be within the prediction field of view based on the predicted location of the object. In another example, an object may continue to be tracked if it is expected to be within range of a targeting system based on the predicted location of the object. Vector trajectories between weed locations $x_1$, $x_2$, and $x_3$ at time (t) and weed locations $y_1$, $y_2$, and $y_3$ at time (t+dt) are determined. Since the weed at location $y_4$ does not have a corresponding location at time (t), no vector trajectory is determined. The vector trajectories may be used to predict locations of the corresponding weeds at later points in time.

In some embodiments, deduplication may comprise comparing parameters of tracked objects identified across two or more images to determine whether a first object in a first image is the same as a second object in a second image. Parameters such as size, shape, category, orientation, or type may be determined for an object identified in an image. For example, a plant may have parameters corresponding to plant size, leaf shape, plant category (e.g., weed or crop), or plant type (e.g., onion, strawberry, corn, soybeans, barley, oats, wheat, alfalfa, cotton, hay, tobacco, rice, sorghum, tomato, potato, grape, rice, lettuce, bean, pea, sugar beet, grass, broadleaf, offshoot, or purslane). A first object identified in a first image may be the same as a second object identified in a second image if a parameter of the first object is the same as or similar to a parameter of the second object. For example, the first object may be the same as the second object if the size of the first object is similar to the size of the second object. In another example, the first object may be the same as the second object if the type of the first object is the same as the type of the second object (e.g., if the first object and the second object are both weeds). In another example, the first object may be the same as the second object if the shape (e.g., leaf shape) of the first object is similar to the shape of the second object. In some embodiments, a first object identified in a first image may be different than a second object identified in a second image if a parameter of the first object is different than a parameter of the second object. For example, the first object may be different than the second object if the size of the first object is different than the size of the second object. In another example, the first object may be different than the second object if the type of the first object is different than the type of the second object (e.g., if the first object is a weed and the second object is a crop). In another example, the first object may be different than the second object if the shape (e.g., leaf shape) of the first object is different than the shape of the second object. In another example, the first object may be different than the second object if the orientation (e.g., leaf orientation or stalk orientation) of the first object is different than the orientation of the second object.

Object parameters may be determined using a trained machine learning model. The machine learning model may be trained using a sample training dataset of images, such as high-resolution images, for example of surfaces with or without plants, pests, or other objects. The training images may be labeled with one or more object parameters, such as object location, object size (e.g., radius, diameter, surface area, or a combination thereof), object category (e.g., weed, crop, equipment, pest, or surface irregularity), plant type (e.g., grass, broadleaf, purslane, onion, strawberry, corn, soybeans, barley, oats, wheat, alfalfa, cotton, hay, tobacco, rice, sorghum, tomato, potato, grape, rice, lettuce, bean, pea, sugar beet, etc.), or combinations thereof.

Deduplication may further comprise determining a confidence score for an object location or parameter and using the confidence score to assess whether a first object in a first image is the same as a second object in a second image. Confidence scores may quantify the confidence with which an object has been identified, classified, located, or combinations thereof. For example, a confidence score may quantify the certainty that a plant is classified as a weed. In another example, a confidence score may quantify a certainty that a plant is a certain plant type (e.g., grass, broadleaf, purslane, onion, strawberry, corn, soybeans, barley, oats, wheat, alfalfa, cotton, hay, tobacco, rice, sorghum, tomato, potato, grape, rice, lettuce, bean, pea, sugar beet, etc.). In some embodiments, a confidence score may quantify the certainty that an object is not a particular class or type. For example, a confidence score may quantify the certainty that an object is not a crop. A confidence score may be assigned to each identified object in each collected image for each evaluated parameter (e.g., one or more of object location, size, shape, category, orientation, or type). A confidence score may be used to determine whether a first image is the same as a second object in a second image. Two objects in different images identified as having the same or similar parameter with high confidence may be identified as the same object. For example, a first object identified with high confidence as a weed may be the same as a second object identified as a weed with high confidence. Two objects in different images identified as having a different parameter with high confidence may be identified as different objects. For example, a first object identified as a weed with high confidence may different than a second object identified as a crop with high confidence. Two objects in different images identified as having a different parameter with low confidence may not be different objects due to the ambiguity of the parameter determination. For example, a first object identified as a weed with low confidence may not be different than a second object identified as a crop with low confidence.

In some embodiments, a confidence score may range from zero to one, with zero corresponding to low confidence and one corresponding to high confidence. The threshold for values considered to be high confidence may depend on the situation and may be tuned based on a desired outcome. In some embodiments, a high confidence value may be considered greater than or equal to 0.5, greater than or equal to 0.6, greater than or equal to 0.7, greater than or equal to 0.8, or greater than or equal to 0.9. In some embodiments, a low confidence value may be considered less than 0.3, less than 0.4, less than 0.5, less than 0.6, less than 0.7, or less than 0.8. An object with a higher confidence score for a first object category and lower confidence scores for a second object category may be identified as the first object category. For example, an object that has a confidence score of 0.6 for a weed category, a confidence score of 0.1 for a crop category may be identified as a weed.

Location Prediction

The object tracking methods described herein may comprise predicting a location of an object relative to a moving body (e.g., a moving vehicle) at a future point in time. In some embodiments, a predicted location may be utilized by a targeting system of the present disclosure to target the object at the predicted location at the future point in time. The predicted location may comprise a first dimension, a second dimension, a third dimension, or combinations thereof. The first dimension and the second dimension may be parallel to the plane of an image collected by a prediction sensor, parallel to an average plan of the surface, or both. In some embodiments, the first dimension may be parallel to the direction of travel of the moving body. The third dimension may be perpendicular to the plane of an image collected by a prediction sensor, perpendicular to an average plan of the surface, or both. In some embodiments, the predicted location may comprise a trajectory. The trajectory may be used to predict changes in the object location over time. In some embodiments, the trajectory may be determined from the location of the object in a first image, the location of the object in a second image, the predicted location of the object, the vector velocity of the moving body, and combinations thereof.

The predicted location of the object may be determined from two or more of the location of the object in a first image, the location of the object in a second image, and the vector velocity (comprising magnitude and direction) of the moving body. An elapsed time from collection of the first image and collection of the second image, a time from collection of the first image or the second image and the future point in time, or both may also be used. For example, a trajectory of the object may be determined from the location of the object in the first image, the location of the object in the second image. A vector velocity of the object relative to the moving body may be determined from the trajectory and the elapsed time from collection of the first image and collection of the second image. Using the vector velocity of the object, a predicted location may be determined for the object at the future point in time based on the time between collection of the second image and the future point in time.

In another example, a vector velocity of the object may be determined from the location of the object in the first image and the vector velocity of the moving body. Using the vector velocity of the object, a predicted location may be determined for the object at the future point in time based on the time between collection of the second image and the future point in time. In some embodiments, the predicted location may be adjusted based on changes in the vector velocity of the moving body between location of the object in the first image or the second image and the future point in time. In some embodiments, a predicted location determined from the location of the object in a first image and the location of the object in a second image may be more accurate than a predicted location determined from the location of the object in a single image.

Determining the predicted location may comprise estimating a height or elevation of the object relative to the moving body. Estimating the height or elevation of the object may improve the accuracy of the predicted location, increase targeting precision, or both. The height or elevation of the object may correspond to a location of the object in a third dimension (e.g., perpendicular to the plane of an image collected by a prediction sensor, perpendicular to an average plan of the surface, or both). The height or elevation of the object may be determined based on the location of the object in a first image, the location of the object in the second image, and a displacement of the moving body during a time elapsed from collection of the first image to collection of the second image. In some embodiments, displacement of the moving body may be determined based on the vector velocity of the moving body relative to the surface. In some embodiments, displacement of the moving body may be determined based on an average displacement of objects located in the first image and the second image.

The object may be targeted at the predicted location by pointing a targeting sensor, an implement, or both toward the predicted location. The targeting sensor, the implement, or both may be controlled by actuators (e.g., servos). In some embodiments, targeting the object at the predicted location may comprise applying a calibration factor to the predicted location. The calibration factor may convert the predicted location between a first frame of reference (e.g., a surface frame of reference, a vehicle frame of reference, a prediction sensor image frame of reference, a targeting sensor image frame of reference, a targeting sensor actuator frame of reference, or an implement actuator frame of reference) and a second frame of reference (e.g., a surface frame of reference, a vehicle frame of reference, a prediction sensor image frame of reference, a targeting sensor image frame of reference, a targeting sensor actuator frame of reference, or an implement actuator frame of reference). For example, a calibration factor may convert the predicted location from a surface frame of reference to a targeting sensor frame of reference. In another example, the calibration factor may convert the predicted location from a prediction sensor frame of reference to a targeting sensor frame of reference. In another example, the calibration factor may convert the predicted location from a surface frame of reference to an implement actuator frame of reference. In another example, the calibration factor may convert the predicted location from a prediction sensor frame of reference to an implement actuator frame of reference. In some embodiment, the calibration factor may comprise a calibration spline or a geometric calibration.

Targeting the object may comprise tracking the object over time as it moves relative to the moving body. In some embodiments, the targeting sensor, the implement, or both may change position over time such that the target is maintained. For example, a laser implement may be repositioned such that the laser continues to irradiate the object while the system moves relative to the object. Repositioning of the targeting sensor, the implement, or both may be performed based on the trajectory of the object, the vector velocity of the moving body, or a combination thereof.

Velocity Determination or Estimation

The object tracking methods described herein may comprise determining or estimating the velocity of a moving body. The velocity may be relative to a surface or relative to one or more objects. The velocity may be a vector velocity comprising both magnitude and direction. The direction may comprise a first dimension. In some embodiments, the direction may comprise a second dimension, a third dimension, or both. In some embodiments, dimensions may be determined relative to the direction of travel. For example, the direction of travel may be the first dimension.

Various methods may be used to determine or estimate the velocity of the moving body. In some embodiments, the velocity may be determined by measuring the displacement of the moving body over time, for example using a device such as a wheel encoder or rotary encoder, an Inertial Measurement Unit (IMU), a Global Positioning System (GPS), a ranging sensor (e.g., laser, SONAR, or RADAR), or an Internal Navigation System (INS) positioned on or coupled to the moving body. A rotary encoder or wheel encoder may convert angular motions of a wheel of the moving body to a distance traveled.

Alternatively or in addition, the velocity of the moving body may be estimated using computer vision (CV). An example of a computer vision that may be used to estimate the velocity of the moving body may be optical flow. Optical flow may comprise determining a shift between a first image and a second image collected by a sensor coupled to the moving body. The shift may be a pixel shift, a shift relative to a surface, a shift relative to one or more objects, or combinations thereof. In some embodiments, optical flow may detect relative motion of the moving body and a surface, the object, or multiple objects between the first image and the second image.

Velocity determination or estimation may be performed more frequently than objection identification or location. In some embodiments, velocity estimation may be performed using one or more image frames collected in between image frames used to identify or locate objects. For example, optical flow analysis may be less computationally intensive than object identification and location, so velocity estimation by optical flow may be performed more often than object identification and location. In some embodiments, two or more velocity measurements or estimations may be used to determine a vector velocity of the moving body. Alternatively or in addition, optical flow may be used to determine a vector velocity of an object relative to a surface. For example, optical flow may be used to determine the trajectory of an object that moves slowly relative to the surface, such as an insect or a pest. In some embodiments, the velocity of the moving body relative to the surface and the velocity of the object relative to the surface may be combined to determine the velocity of the moving body relative to the object.

In some embodiments, the first image and the second image used for optical flow may be displaced by no more than about 90%. In some embodiments, the first image and the second image used for optical flow may be displaced by no more than about 85%, no more than about 80%, no more than about 75%, no more than about 70%, no more than about 60%, or no more than about 50%. In some embodiments, the first image and the second image used for optical flow may overlap by at least about 10%. In some embodiments, the first image and the second image used for optical flow may overlap by at least about 10%, at least about 20%, at least about 30%, at least about 40%, or at least about 50%. In some embodiments, the first image and the second image used for optical flow may overlap by from about 10% to about 99%, from about 10% to about 90%, from about 20% to about 80%, or from about 30% to about 70%.

Distortion Corrections

The object tracking methods or object targeting methods described herein may comprise correcting for various distortions introduced into the systems implementing the methods. Sources of distortions may include lens, reflective elements, and other optical elements; differences in object height or elevation; surface irregularities; sensor pose changes; vehicle pose changes; or actuator motions.

The methods of the present disclosure may be implemented by an optical system comprising one or more optical elements (e.g., lenses, reflective elements, or beam splitters) that may introduce distortions into an image collected by an image sensor (e.g., a prediction sensor or a targeting sensor). If unaccounted for, image distortions may lead to inaccuracies when converting to or from an image frame of reference. Distortions may include radial distortions, chromatic distortions, or other distortions. For example, a lens may cause radial distortions such as barrel distortions, pincushion distortions, mustache distortions, or a combination thereof. In another example, a reflective element (e.g., a mirror or a dichroic element) may cause distortions due to a non-planar surface, positioning off of a 45° angle, or chromatic aberrations. Such image distortions may be corrected using a calibration, such as a geometric calibration or a calibration spline. In some embodiments, calibration to correct for image distortions may comprise mapping points on a surface to pixel positions in an image collected of the surface. The image may be transformed to produce a uniform pixel density per real world or surface unit.

Distortions may be introduced into a targeting system of the present disclosure due to angular motions of reflective elements. In some embodiments, movement of an actuator that aims a targeting sensor or an implement (e.g., a laser) relative to movement of the targeting sensor or the implement may be non-linear across the range of motion due to reflective elements along the optical path. For example, laser aiming may be controlled by rotation of a first mirror by a first actuator along a first axis (e.g., a tilt axis) and rotation of a second mirror by a second actuator along a second axis (e.g., a pan axis). The first mirror may be positioned before the second mirror along the optical path of the laser such that movement of the laser along the first axis is non-linear with respect to actuator motions across the full range of motion. The nonlinearity may be more pronounced for extreme pan angles, which may result in a pillow-shaped distortion. Such targeting distortions (e.g., pillow-shaped distortions of the targeting sensor or implement) may be corrected using a calibration factor, such as a geometric calibration or a calibration spline. In some embodiments, calibration factor may be determined by mapping a position of the targeting sensor or implement on a surface to pan and tilt actuator positions. Correcting for targeting distortions may improve targeting accuracy.

Differences in height or elevation between objects present in a first image may lead to apparent distortion of object locations in a second image due to parallax. Briefly, an object that is closer to an image sensor, along an axis perpendicular to the image plane, may appear to move farther from a first image to a second image collected by the same image sensor from a different angle than an object that is farther away from the image sensor. As a result, predicted locations may be less accurate for objects of variable height or on an uneven surface. As described herein, a predicted location of an object may be revised based on a height or elevation of the object (e.g., along an axis perpendicular to the plane of an image collected by a prediction sensor, perpendicular to an average plan of the surface, or both).

Optical Control Systems

The methods described herein may be implemented by an optical control system, such as a laser optical system, to target an object of interest. For example, an optical system may be used to target an object of interest identified in an image or representation collected by a first sensor, such as a prediction sensor, and locate the same object in an image or representation collected by a second sensor, such as a targeting sensor. In some embodiments, the first sensor is a prediction camera and the second sensor is a targeting camera. Targeting the object may comprise precisely locating the object using the targeting sensor and targeting the object with an implement.

Described herein are optical control systems for directing a beam, for example a light beam, toward a target location on a surface, such as a location of an object of interest. In some embodiments, the implement is a laser. However, other implements are within the scope of the present disclosure, including but not limited to a grabbing implement, a spraying implement, a planting implement, a harvesting implement, a pollinating implement, a marking implement, a blowing implement, or a depositing implement.

In some embodiments, an emitter is configured to direct a beam along an optical path, for example a laser path. In some embodiments, the beam comprises electromagnetic radiation, for example light, radio waves, microwaves, or x-rays. In some embodiments, the light is visible light, infrared light, or ultraviolet light. The beam may be coherent. In one embodiment, the emitter is a laser, such as an infrared laser.

One or more optical elements may be positioned in a path of the beam. The optical elements may comprise a beam combiner, a lens, a reflective element, or any other optical elements that may be configured to direct, focus, filter, or otherwise control light. The elements may be configured in the order of the beam combiner, followed by a first reflective element, followed by a second reflective element, in the direction of the beam path. In another example, one or both of the first reflective element or the second reflective element may be configured before the beam combiner, in order of the direction of the beam path. In another example, the optical elements may be configured in the order of the beam combiner, followed by the first reflective element in order of the direction of the beam path. In another example, one or both of the first reflective element or the second reflective element may be configured before the beam combiner, in the direction of the beam path. Any number of additional reflective elements may be positioned in the beam path.

The beam combiner may also be referred to as a beam combining element. In some embodiments, the beam combiner may be a zinc selenide (ZnSe), zinc sulfide (ZnS), or germanium (Ge) beam combiner. For example, the beam combiner may be configured to transmit infrared light and reflect visible light. In some embodiments, the beam combiner may be a dichroic. In some embodiments, the beam combiner may be configured to pass electromagnetic radiation having a wavelength longer than a cutoff wavelength and reflect electromagnetic radiation having a wavelength shorter than the cutoff wavelength. In some embodiments, the beam combiner may be configured to pass electromagnetic radiation having a wavelength shorter than a cutoff wavelength and reflect electromagnetic radiation having a wavelength longer than the cutoff wavelength. In other embodiments, the beam combiner may be a polarizing beam splitter, a long pass filter, a short pass filter, or a band pass filter.

An optical control system of the present disclosure may further comprise a lens positioned in the optical path. In some embodiments, a lens may be a focusing lens positioned such that the focusing lens focuses the beam, the scattered light, or both. For example, a focusing lens may be positioned in the visible light path to focus the scattered light onto the targeting camera. In some embodiments, a lens may be a defocusing lens positioned such that the defocusing lens defocuses the beam, the scattered light, or both. In some embodiments, the lens may be a collimating lens positioned such that the collimating lens collimates the beam, the scattered light, or both. In some embodiments, two or more lenses may be positioned in the optical path. For example, two lenses may be positioned in the optical path in series to expand or narrow the beam.

The positions and orientations of one or both of the first reflective element and the second reflective element may be controlled by one or more actuators. In some embodiments, an actuator may be a motor, a solenoid, a galvanometer, or a servo. For example, the position of the first reflective element may be controlled by a first actuator, and the position and orientation of the second reflective element may be controlled by a second actuator. In some embodiments, a single reflective element may be controlled by a plurality of actuators. For example, the first reflective element may be controlled by a first actuator along a first axis and a second actuator along a second axis. Optionally, the mirror may be controlled by a first actuator, a second actuator, and a third actuator, providing multi-axis control of the mirror. In some embodiments, a single actuator may control a reflective element along one or more axes. In some embodiments, a single reflective element may be controlled by a single actuator.

An actuator may change a position of a reflective element by rotating the reflective element, thereby changing an angle of incidence of a beam encountering the reflective element. Changing the angle of incidence may cause a translation of the position at which the beam encounters the surface. In some embodiments, the angle of incidence may be adjusted such that the position at which the beam encounters the surface is maintained while the optical system moves with respect to the surface. In some embodiments, the first actuator rotates the first reflective element about a first rotational axis, thereby translating the position at which the beam encounters the surface along a first translational axis, and the second actuator rotates the second reflective element about a second rotational axis, thereby translating the position at which the beam encounters the surface along a second translational axis. In some embodiments, a first actuator and a second actuator rotate a first reflective element about a first rotational axis and a second rotational axis, thereby translating the position at which the beam encounters the surface of the first reflective element along a first translational axis and a second translational axis. For example, a single reflective element may be controlled by a first actuator and a second actuator, providing translation of the position at which the beam encounters the surface along a first translation axis and a second translation axis with a single reflective element controlled by two actuators. In another example, a single reflective element may be controlled by one, two, or three actuators.

The first translational axis and the second translational axis may be orthogonal. A coverage area on the surface may be defined by a maximum translation along the first translational axis and a maximum translation along the second translation axis. One or both of the first actuator and the second actuator may be servo-controlled, piezoelectric actuated, piezo inertial actuated, stepper motor-controlled, galvanometer-driven, linear actuator-controlled, or any combination thereof. One or both of the first reflective element and the second reflective element may be a mirror; for example, a dichroic mirror, or a dielectric mirror; a prism; a beam splitter; or any combination thereof. In some embodiments, one or both of the first reflective element and the second reflective element may be any element capable of deflecting the beam.

A targeting camera may be positioned to capture light, for example visible light, traveling along a visible light path in a direction opposite the beam path, for example laser path. The light may be scattered by a surface, such as the surface with an object of interest, or an object, such as an object of interest, and travel toward the targeting camera along visible light path. In some embodiments, the targeting camera is positioned such that it captures light reflected off of the beam combiner. In other embodiments, the targeting camera is positioned such that it captures light transmitted through the beam combiner. With the capture of such light, the targeting camera may be configured to image a target field of view on a surface. The targeting camera may be coupled to the beam combiner, or the targeting camera may be coupled to a support structure supporting the beam combiner. In one embodiment, the targeting camera does not move with respect to the beam combiner, such that the targeting camera maintains a fixed position relative to the beam combiner.

An optical control system of the present disclosure may further comprise an exit window positioned in the beam path. In some embodiments, the exit window may be the last optical element encountered by the beam prior to exiting the optical control system. The exit window may comprise a material that is substantially transparent to visible light, infrared light, ultraviolet light, or any combination thereof. For example, the exit window may comprise glass, quartz, fused silica, zinc selenide, zinc sulfide, a transparent polymer, or a combination thereof. In some embodiments, the exit window may comprise a scratch-resistant coating, such as a diamond coating. The exit window may prevent dust, debris, water, or any combination thereof from reaching the other optical elements of the optical control system. In some embodiments, the exit window may be part of a protective casing surrounding the optical control system.

After exiting the optical control system, the beam may be directed along beam path toward a surface. In some embodiments, the surface contains an object of interest, for example a weed. Rotational motions of reflective elements may produce a laser sweep along a first translational axis and a laser sweep along a second translational axis. The rotational motions of reflective elements may control the location at which the beam encounters the surface. For example, the rotation motions of reflective elements may move the location at which the beam encounters the surface to a position of an object of interest on the surface. In some embodiments, the beam is configured to damage the object of interest. For example, the beam may comprise electromagnetic radiation, and the beam may irradiate the object. In another example, the beam may comprise infrared light, and the beam may burn the object. In some embodiments, one or both of the reflective elements may be rotated such that the beam scans an area surrounding and including the object.

A prediction camera or prediction sensor may coordinate with an optical control system, such as optical control system, to identify and locate objects to target. The prediction camera may have a field of view that encompasses a coverage area of the optical control system covered by amiable laser sweeps. The prediction camera may be configured to capture an image or representation of a region that includes the coverage area to identify and select an object to target. The selected object may be assigned to the optical control system. In some embodiments, the prediction camera field of view and the coverage area of the optical control system may be temporally separated such that prediction camera field of view encompasses the target at a first time and the optical control system coverage area encompasses the target at a second time. Optionally, the prediction camera, the optical control system, or both may move with respect to the target between the first time and the second time.

In some embodiments, a plurality of optical control systems may be combined to increase a coverage area on a surface. The plurality of optical control systems may be configured such that the laser sweep along a translational axis of each optical control system overlaps with the laser sweep along the translational axis of the neighboring optical control system. The combined laser sweep defines a coverage area that may be reached by at least one beam of a plurality of beams from the plurality of optical control systems. One or more prediction cameras may be positioned such that a prediction camera field of view covered by the one or more prediction cameras fully encompasses the coverage area. In some embodiments, a detection system may comprise two or more prediction cameras, each having a field of view. The fields of view of the prediction cameras may be combined to form a prediction field of view that fully encompass the coverage area. In some embodiments, the prediction field of view does not fully encompass the coverage area at a single time point but may encompass the coverage area over two or more time points (e.g., image frames). Optionally, the prediction camera or cameras may move relative to the coverage area over the course of the two or more time points, enabling temporal coverage of the coverage area. The prediction camera or prediction sensor may be configured to capture an image or representation of a region that includes coverage area to identify and select an object to target. The selected object may be assigned to one of the plurality of optical control systems based on the location of the object and the area covered by laser sweeps of the individual optical control systems.

The plurality of optical control systems may be configured on a vehicle, such as vehicle 100 illustrated in FIG. 1-FIG. 3. For example, the vehicle may be a driverless vehicle. The driverless vehicle may be a robot. In some embodiments, the vehicle may be controlled by a human. For example, the vehicle may be driven by a human driver. In some embodiments, the vehicle may be coupled to a second vehicle being driven by a human driver, for example towed behind or pushed by the second vehicle. The vehicle may be controlled by a human remotely, for example by remote control. In some embodiments, the vehicle may be controlled remotely via longwave signals, optical signals, satellite, or any other remote communication method. The plurality of optical control systems may be configured on the vehicle such that the coverage area overlaps with a surface underneath, behind, in front of, or surrounding the vehicle.

The vehicle may be configured to navigate a surface containing a plurality of objects, including one or more objects of interest, for example a crop field containing a plurality of plants and one or more weeds. The vehicle may comprise one or more of a plurality of wheels, a power source, a motor, a prediction camera, or any combination thereof. In some embodiments, the vehicle has sufficient clearance above the surface to drive over a plant, for example a crop, without damaging the plant. In some embodiments, a space between an inside edge of a left wheel and an inside edge of a right wheel is wide enough to pass over a row of plants without damaging the plants. In some embodiments, a distance between an outside edge of a left wheel and an outside edge of a right wheel is narrow enough to allow the vehicle to pass between two rows of plants, for example two rows of crops, without damaging the plants. In one embodiment, the vehicle comprising the plurality of wheels, the plurality of optical control systems, and the prediction camera may navigate rows of crops and emit a beam of the plurality of beams toward a target, for example a weed, thereby burning or irradiating the weed.

Computer Systems and Methods

The object identification and targeting methods may be implemented using a computer system. In some embodiments, the detection systems described herein include a computer system. In some embodiments, a computer system may implement the object identification and targeting methods autonomously without human input. In some embodiments, a computer system may implement the object identification and targeting methods based on instructions provided by a human user through a detection terminal.

Figure 9:
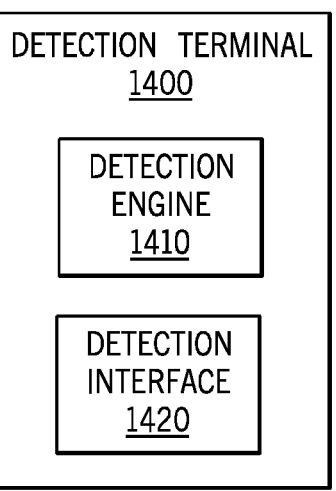
FIG. 9 is a block diagram illustrating components of a detection terminal in accordance with embodiments of the present disclosure.

FIG. 9 illustrates components in a block diagram of a non-limiting exemplary embodiment of a detection terminal 1400 according to various aspects of the present disclosure. In some embodiments, the detection terminal 1400 is a device that displays a user interface in order to provide access to the detection system. As shown, the detection terminal 1400 includes a detection interface 1420. The detection interface 1420 allows the detection terminal 1400 to communicate with a detection system, such a detection system of FIG. 3 or FIG. 4. In some embodiments, the detection interface 1420 may include an antenna configured to communicate with the detection system, for example by remote control. In some embodiments, the detection terminal 1400 may also include a local communication interface, such as an Ethernet interface, a Wi-Fi interface, or other interface that allows other devices associated with detection system to connect to the detection system via the detection terminal 1400. For example, a detection terminal may be a handheld device, such as a mobile phone, running a graphical interface that enables a user to operate or monitor the detection system remotely over Bluetooth, Wi-Fi, or mobile network.

The detection terminal 1400 further includes detection engine 1410. The detection engine may receive information regarding the status of a detection system, for example a detection system of FIG. 3 or FIG. 4. The detection engine may receive information regarding the number of objects identified, the identity of objects identified, the location of objects identified, the trajectories and predicted locations of objects identified, the number of objects targeted, the identity of objects targeted, the location of objects targeted, the location of the detection system, the elapsed time of a task performed by the detection system, an area covered by the detection system, a battery charge of the detection system, or combinations thereof.

Actual embodiments of the illustrated devices will have more components included therein which are known to one of ordinary skill in the art. For example, each of the illustrated devices will have a power source, one or more processors, computer-readable media for storing computer-executable instructions, and so on. These additional components are not illustrated herein for the sake of clarity.

Figure 10:
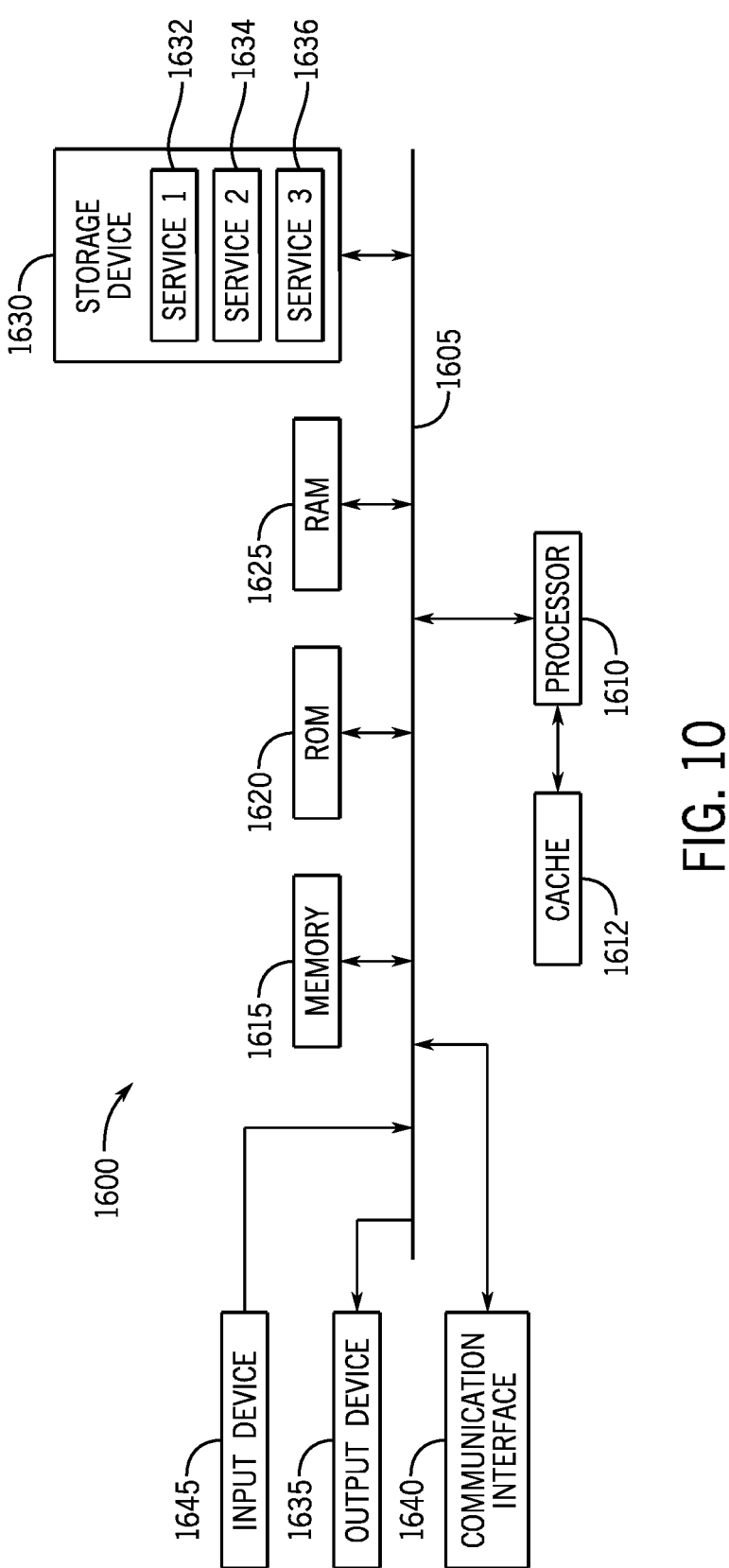
FIG. 10 is an exemplary block diagram of a computing device architecture of a computing device which can implement the various techniques described herein.

In some examples, the procedures described herein (e.g., procedure 500 of FIG. 5, 600 of FIG. 6, or other procedures described herein) may be performed by a computing device or apparatus, such as a computing device having the computing device architecture 1600 shown in FIG. 10. In one example, the procedures described herein can be performed by a computing device with the computing device architecture 1600. The computing device can include any suitable device, such as a mobile device (e.g., a mobile phone), a desktop computing device, a tablet computing device, a wearable device, a server (e.g., in a software as a service (Saas) system or other server-based system), and/or any other computing device with the resource capabilities to perform the processes described herein, including procedure 500 or 600. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Procedures 500 and 600 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 illustrates an example computing device architecture 1600 of an example computing device which can implement the various techniques described herein. For example, the computing device architecture 1600 can implement procedures shown in FIG. 5 and FIG. 6, control the detection system shown in FIG. 3 or FIG. 4, or control the vehicles shown in FIG. 1 and FIG. 2. The components of computing device architecture 1600 are shown in electrical communication with each other using connection 1605, such as a bus. The example computing device architecture 1600 includes a processing unit (which may include a CPU and/or GPU) 1610 and computing device connection 1605 that couples various computing device components including computing device memory 1615, such as read only memory (ROM) 1620 and random access memory (RAM) 1625, to processor 1610. In some embodiments, a computing device may comprise a hardware accelerator.

Computing device architecture 1600 can include a cache of high-speed memory connected directly with, in close proximity to, or integrated as part of processor 1610. Computing device architecture 1600 can copy data from memory 1615 and/or the storage device 1630 to cache 1612 for quick access by processor 1610. In this way, the cache can provide a performance boost that avoids processor 1610 delays while waiting for data. These and other modules can control or be configured to control processor 1610 to perform various actions. Other computing device memory 1615 may be available for use as well. Memory 1615 can include multiple different types of memory with different performance characteristics. Processor 1610 can include any general purpose processor and a hardware or software service, such as service 1 1632, service 2 1634, and service 3 1636 stored in storage device 1630, configured to control processor 1610 as well as a special-purpose processor where software instructions are incorporated into the processor design. Processor 1610 may be a self-contained system, containing multiple cores or processors, a bus, memory controller, cache, etc. A multi-core processor may be symmetric or asymmetric.

To enable user interaction with the computing device architecture 1610, input device 1645 can represent any number of input mechanisms, such as a microphone for speech, a touch-sensitive screen for gesture or graphical input, keyboard, mouse, motion input, speech and so forth. Output device 1635 can also be one or more of a number of output mechanisms known to those of skill in the art, such as a display, projector, television, speaker device, etc. In some instances, multimodal computing devices can enable a user to provide multiple types of input to communicate with computing device architecture 1600. Communication interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. Storage device 1630 can include services 1632, 1634, 1636 for controlling processor 1610. Other hardware or software modules are contemplated. Storage device 1630 can be connected to the computing device connection 1605. In one aspect, a hardware module that performs a particular function can include the software component stored in a computer-readable medium in connection with the necessary hardware components, such as processor 1610, connection 1605, output device 1635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

While illustrative embodiments have been illustrated and described, it will be appreciated that various changes can be made therein without departing from the spirit and scope of the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

As used herein, the terms "about" and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

EXAMPLES

The invention is further illustrated by the following non-limiting examples.

Example 1

Eradication of Weeds in a Field of Crops

This example describes eradication of weeds in a field of crops using the object tracking methods of the present disclosure. A vehicle, as illustrated in FIG. 1 and FIG. 3, equipped with a prediction system, a targeting system, and an infrared laser was positioned in a field of crops, as illustrated in FIG. 2. The vehicle navigated the rows of crops at a speed of about 2 miles per hour, and a prediction camera collected images of the field. The prediction system identified weeds within the images and tracked weeds by pairing same weeds identified in two or more images and deduplicating the images. The prediction system selected a weed of the tracked weeds to eradicate. The prediction system determined a predicted location of the weed based on the location of the weed in a first image, the location of the weed in a second image, and the time at which the weed would be targeted. The prediction system sent the predicted location to the targeting system.

The targeting system was selected based on availability and proximity to the selected weed. The targeting system included a targeting camera and infrared laser, the directions of which were adjusted by mirrors controlled by actuators. The mirrors reflected the visible light from the surface to the targeting camera and reflected the infrared light from the laser to the surface. The targeting system converted the predicted location received from the prediction system to actuator positions. The targeting system adjusted the actuators to point the targeting camera and infrared laser beam toward the predicted position of the selected weed. The targeting camera imaged the field at the predicted position of the weed and the location was revised to produce a target location. The targeting system adjusted the position of the targeting camera and infrared laser beam based on the target location of the weed and activated the infrared beam directed toward the location of the weed. The beam irradiated the weed with infrared light for an amount of time sufficient to damage or kill the weed, while adjusting the position of the laser beam to account for movement of the autonomous vehicle during irradiation.

Example 2

Debris Tracking and Removal in a Construction Environment

This example describes a system and method for automated identification and removal of debris in a rugged environment. A vehicle with a prediction camera, a targeting camera, and a debris collection implement navigates a construction site. The construction site has a rugged terrain surface. The prediction camera images a region of the construction site surface and detects debris within the image. The prediction system identifies debris within the images collected by the prediction camera and tracks debris by pairing same debris objects identified in two or more images and deduplicating the images. The prediction system selects a debris object of the identified debris to collect. The prediction system determines a predicted location of the debris based on the location of the debris in a first image, the location of the debris in a second image, and the vector velocity of the vehicle. The prediction system sends the predicted location to the targeting system.

The targeting system is selected based on availability and proximity to the selected debris. The targeting system directs actuators controlling the targeting camera and the debris collection implement to point the targeting camera and the debris collection implement toward the predicted location of the selected debris. The targeting camera images the construction site at the predicted position of the debris and the location is revised to produce a target location. The targeting system directs the actuators to point the targeting camera and the debris collection implement toward the target location of the debris, and the debris collection implement collects the debris.

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of tracking objects relative to a moving vehicle, the method comprising:

receiving, from an imaging sensor, a first image capturing a first region at a first time;

determining, in the first image, a first set of actual locations for a first set of objects relative to a moving vehicle;

receiving, from the imaging sensor, a second image capturing a second region at a second time, wherein the second region includes at least a portion of the first region;

determining, in the second image, a second set of actual locations for a second set of objects relative to the moving vehicle, wherein the second set of objects includes one or more of the same objects as the first set of objects;

identifying a tracked object included in the first set of objects;

applying a predicted shift to a first actual location of the tracked object in the first image at the first time to produce a shifted location of the tracked object at the second time;

designating a search area;

selecting a second actual location of the tracked object in the second image from the second set of objects in the second image at the second time from the second set of actual locations, wherein the second actual location of the tracked object in the second image at the second time is within the search area;

determining a vector displacement of the tracked object between the first time and the second time from the first actual location of the tracked object in the first image at the first time and the second actual location of the tracked object in the second image at the second time;

predicting a location of the tracked object based at least in part on the vector displacement, and manipulating the tracked object at the predicted location.

2. The method of claim 1, further comprising designating the search area around the shifted location of the tracked object or the first actual location of the tracked object.

3. The method of claim 1, further comprising applying the predicted shift to each location of the first set of actual locations to produce a set of shifted locations comprising the shifted location of the tracked object.

4. The method of claim 3, further comprising applying a plurality of test shifts to the first set of shifted locations to obtain a set of test locations for the first set of objects at the second time, wherein each test shift of the plurality of test shifts is determined based on a distance between the shifted location and a second actual location of the second set of actual locations.

5. The method of claim 4, further comprising determining a plurality of offsets between each test location of the set of test locations and each second actual location of the second set of actual locations for the second set of objects at the second time, wherein each offset of the plurality of offsets corresponds to a test shift of the plurality of test shifts, and selecting a refined shift from the plurality of test shifts based on the plurality of offsets.

6. The method of claim 1, further comprising applying a second shift to the shifted location to produce a revised shifted location of the tracked object, wherein the second shift is based on a distance between the shifted location and the second actual location.

7. The method of claim 6, further comprising designating the search area around the revised shifted location of the tracked object.

8. The method of claim 1, further comprising determining a vector velocity of the moving vehicle, wherein the predicted shift is based on the vector velocity of the moving vehicle and a time difference between the first time and the second time.

9. The method of claim 8, wherein the vector velocity is determined using optical flow, a rotary encoder, a global positioning system, the vector displacement of the tracked object, or a combination thereof.

10. The method of claim 8, further comprising determining a trajectory of the tracked object over time based on the vector displacement of the tracked object between the first time and the second time and the vector velocity of the moving vehicle.

11. The method of claim 8, further comprising determining a predicted location of the tracked object at a third time based on the vector velocity of the moving vehicle and an elapsed time between the second time and the third time.

12. The method of claim 1, further comprising determining a predicted location of the tracked object at a third time based on the vector displacement of the tracked object between the first time and the second time and an elapsed time between the second time and the third time.

13. The method of claim 1, further comprising applying a plurality of test shifts to the first set of actual locations for the first set of objects to obtain a set of test locations for the first set of objects at the second time, wherein each test shift of the plurality of test shifts is determined based on a distance between a first actual location of a first object at the first time and a second actual location of a second object at the second time.

14. The method of claim 13, wherein the predicted shift is based on a test shift of the plurality of test shifts with the smallest corresponding offset, wherein the offset is between each of the test locations of the set of test locations for the first set of objects at the second time and each of the second set of actual locations for the second set of objects at the second time.

15. The method of claim 1, further comprising determining a second predicted location based on the predicted location and the first actual location of the tracked object in the first image at the first time, the second actual location of the tracked object in the second image at the second time, or both.

16. The method of claim 1, wherein the tracked object is positioned on a surface.

17. The method of claim 16, wherein the vehicle is moving perpendicular to the surface.

18. The method of claim 16, wherein the surface is a ground surface, a dirt surface, or an agricultural surface.

19. The method of claim 1, wherein manipulating the tracked object comprises targeting the tracked object at the predicted location.

20. The method of claim 19, wherein targeting the tracked object comprises correcting for parallax, distortions in the first image, distortions in the second image, targeting distortions, or a combination thereof.

21. The method of claim 19, wherein targeting the tracked object comprises aiming a targeting sensor, an implement, or both toward the predicted location.

22. The method of claim 21, wherein targeting the tracked object further comprises dynamically tracking the object with the targeting sensor, the implement, or both.

23. The method of claim 22, wherein dynamically tracking the object comprises moving the targeting sensor, the implement, or both to match the vector velocity of the moving vehicle such that the targeting sensor, the implement, or both remain aimed toward the predicted location while the moving vehicle moves.

24. The method of claim 21, wherein the implement comprises a laser, a sprayer, or a grabber.

25. The method of claim 21, wherein targeting the tracked object further comprises manipulating the tracked object with the implement, wherein manipulating the tracked object comprises irradiating the tracked object with electromagnetic radiation, moving the tracked object, spraying the tracked object, or combinations thereof.

26. The method of claim 1, wherein the tracked object is a plant.

27. The method of claim 1, wherein the tracked object is a weed or a crop.

28. A method of tracking objects relative to a moving vehicle, the method comprising:
    receiving, from an imaging sensor, a first image capturing a first region at a first time,
    determining, in the first image, a first set of actual locations for a first set of objects relative to the moving vehicle;
    receiving, from the imaging sensor, a second image capturing a second region at a second time, wherein the second region includes at least a portion of the first region,
    determining, in the second image, a second set of actual locations for a second set of objects relative to the moving vehicle, wherein the second set of objects includes one or more of the same objects as the first set of objects;
    applying a plurality of test shifts to the first set of actual locations for the first set of objects to obtain a set of test locations for the first set of objects at the second time, wherein each test shift of the plurality of test shifts is determined based on a distance between a first actual location of a first object at the first time and a second actual location of a second object at the second time;
    determining a plurality of offsets between each of the test locations of the set of test locations for the first set of objects at the second time and each of the second set of actual locations for the second set of objects at the second time, wherein each offset of the plurality of offsets corresponds to a test shift of the plurality of test shifts;
    selecting a refined shift from the plurality of test shifts based on the plurality of offsets;
    identifying the tracked object included in both the first set of objects and the second set of objects;
    predicting a loco cation of the tracked object; and
    manipulating the tracked object at the predicted location.

29. The method of claim 28, further comprising determining a vector displacement of the tracked object between the first time and the second time from the first actual location of the tracked object in the first image at the first time and the second actual location of the tracked object in the second image at the second time.

30. The method of claim 29, further comprising determining a predicted location of the tracked object at a third time based on the vector displacement of the tracked object between the first time and the second time and an elapsed time between the second time and the third time.

31. The method of claim 29, further comprising applying the refined shift to the first set of actual locations for a first set of objects at the first time to establish a set of shifted locations for the first set of objects at the second time.

32. The method of claim 29, wherein the refined shift is a test shift from the plurality of test shifts with the smallest corresponding offset.

* * * * *